US008972651B2

United States Patent
Kawamura et al.

(10) Patent No.: US 8,972,651 B2
(45) Date of Patent: Mar. 3, 2015

(54) STORAGE SYSTEM AND STORAGE METHOD

(75) Inventors: Atsushi Kawamura, Yokohama (JP); Junji Ogawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 670 days.

(21) Appl. No.: 13/265,062

(22) PCT Filed: Oct. 5, 2011

(86) PCT No.: PCT/JP2011/005621
§ 371 (c)(1),
(2), (4) Date: Oct. 18, 2011

(87) PCT Pub. No.: WO2013/051062
PCT Pub. Date: Apr. 11, 2013

(65) Prior Publication Data
US 2013/0091320 A1      Apr. 11, 2013

(51) Int. Cl.
*G06F 12/00* (2006.01)
*G06F 12/02* (2006.01)

(52) U.S. Cl.
CPC .... *G06F 12/0246* (2013.01); *G06F 2212/1028* (2013.01); *G06F 2212/1032* (2013.01); *G06F 2212/7207* (2013.01)
USPC ........... 711/103; 711/102; 711/202; 711/206; 711/E12.008

(58) Field of Classification Search
CPC . G06F 12/0246; G06F 12/1009; G06F 12/10; G06F 2212/7201; G06F 3/0679; G06F 3/0688; G06F 11/1458; G06F 12/0292; G06F 2212/1032
See application file for complete search history.

(56) References Cited

U.S. PATENT DOCUMENTS

| 5,430,855 | A | * | 7/1995 | Walsh et al. ................ 710/10 |
| 2006/0253645 | A1 | | 11/2006 | Lasser |
| 2006/0294339 | A1 | | 12/2006 | Trika et al. |
| 2009/0109786 | A1 | | 4/2009 | Ye et al. |
| 2011/0173380 | A1 | | 7/2011 | Yano et al. |

FOREIGN PATENT DOCUMENTS

| EP | 2209074 A1 | 7/2010 |
| EP | 2264602 A1 | 12/2010 |

(Continued)

OTHER PUBLICATIONS

International Search Report, Date of Mailing Aug. 6, 2012, for PCT/JP2011/005621.

*Primary Examiner* — Reginald Bragdon
*Assistant Examiner* — Thanh D Vo
(74) *Attorney, Agent, or Firm* — Volpe and Koenig, P.C.

(57) ABSTRACT

A storage system comprises a storage comprising a nonvolatile storage medium, and a storage control apparatus for inputting/outputting data to/from the storage. The storage control apparatus comprises a memory for storing management information, which is information used in inputting/outputting data to/from the storage, and a control part for controlling access to the storage. The control part stores the management information, which is stored in the memory, in the storage as a base image, and when the management information is updated subsequent to the base image being stored in the storage, creates a journal comprising information related to this update, and stores the journal in the storage as a journal group which is configured from multiple journals.

14 Claims, 18 Drawing Sheets

(56) References Cited

FOREIGN PATENT DOCUMENTS

| | | |
|---|---|---|
| JP | 08-077074 A | 3/1996 |
| JP | 2001-175423 A | 6/2001 |
| JP | 2009-205689 A | 9/2009 |
| JP | 2009-289014 A | 12/2009 |
| JP | 2010-086009 A | 4/2010 |
| JP | 2010-098403 A | 4/2010 |
| JP | 2010-157141 A | 7/2010 |
| WO | 2005/082037 A2 | 9/2005 |

* cited by examiner

STORAGE SYSTEM AND STORAGE METHOD

TECHNICAL FIELD

The present invention relates to data storage technology.

BACKGROUND ART

Recent advances in semiconductor technology have resulted in the development of nonvolatile semiconductor memory. Flash memory is one type of nonvolatile semiconductor memory. Data storage systems (hereafter, referred to as "storage system") that use flash memory as the storage medium have been developed in recent years.

The characteristics of flash memory (for example, NAND-type flash memory in particular) will be explained next. Flash memory is configured from multiple physical blocks. The physical blocks are configured from multiple physical pages. Flash memory is unable to rewrite data in units of physical pages. Therefore, in a case where the data of a certain physical page is to be rewritten, the following processing is required:

1) Temporarily save data stored in the physical block comprising the rewrite-target physical page to another physical page;
2) Erase all the data from the physical block comprising the rewrite-target physical page; and
3) Write data to the rewrite-target physical page from which the data has been erased.

That is, when rewriting data in a flash memory, data must first be erased. However, it takes longer to erase data from a single physical block of flash memory than it does to write data to a single physical page (for example, roughly an order of magnitude longer). Consequently, a method in which the rewrite data is written to an unused physical page is known.

However, in this case, an unused physical page inside the flash memory is consumed every time a data rewrite occurs. For this reason, in a case where there is a shortage of unused physical pages, an unused physical page must be secured by erasing unneeded data from the flash memory as described hereinbelow. This process is called "reclamation".

1) Identify an erase-target physical block.
2) Copy valid data stored in the erase-target physical block to a different unused physical page. In accordance with this, the data stored in all of the physical pages of the erase-target physical block become invalid data.
3) Erase all the data in the erase-target physical block.

However, the number of data erases is limited in a flash memory. The upper limit of the number of data erases per physical block will differ in accordance with the type of memory cell of the flash memory, but, for example, is around 100,000 times, and exceeding this upper limit runs the risk of no longer being able to erase data (or, no longer being able to store data for a fixed period of time when storing data in a physical block for which the number of data erases has exceeded the upper limit). For this reason, an "equalization function" for equalizing the erases of the respective physical blocks such that erasing is not focused on a specific physical block is incorporated into the flash memory.

Furthermore, the longer that data is stored in the flash memory, the higher the probability of a read error occurring. This phenomenon is called a "retention error". To avoid this phenomenon, a "refresh function" for moving the data of a physical page to a different physical page when a fixed period of time has elapsed is incorporated into the flash memory.

These functions, i.e., "reclamation", the "equalization function" and the "refresh function", are referred to generically as "wear leveling".

To realize the various functions incorporated into the above-described flash memory, the flash memory comprises a logical address-physical address translation table, which denotes the corresponding relationship between a logical address and a physical address. A logical address is presented to a higher-level interface, and the flash memory physical address is concealed. Then, a logical address, which has been specified by the higher-level interface, is translated to the corresponding physical address by referencing the logical address-physical address translation table. For example, in a case where the higher-level interface instructs that data "A" be written to a certain logical address "1", the following processing is executed:

1) Identify an unused physical page "101" of the flash memory;
2) Write the data "A" to the unused physical page "101";
3) Change the reference destination of the logical address "1" in the logical address-physical address translation table to the physical address of the physical page "101" to which the data was written.

The logical address-physical address translation table is updated each time a data write occurs. That is, since the logical address-physical address translation table is frequently updated, this table is generally deployed and used in the main memory for which access performance is high (high-speed data reads and writes). However, data stored in the main memory is erased when the power to the storage system is shut off. Accordingly, when the storage system power is shut off, the logical address-physical address translation table stored in the main memory must be saved to the flash memory.

As a method for saving the data stored in the main memory to the flash memory at high speed, Patent Literature 1 discloses a method, which uses a high-speed mode for writing only to the least significant bit in a case where the flash memory is a multivalued memory (MLC (Multi Level Cell)).

Patent Literature 2 discloses a method for storing the logical address-physical address translation table in flash memory the same as user data, and reconstituting the logical address-physical address translation table from the data stored in the flash memory.

CITATION LIST

Patent Literature

PTL 1: Japanese Patent Application Laid-open No. 2009-289014
PTL 2: Japanese Patent Application Laid-open No. H08-077074

SUMMARY OF INVENTION

Technical Problem

The data size of the management information that is information used for data input/output (for instance, the logical address-physical address translation table etc.) increases proportional to the increase in the capacity of the flash memory. Therefore, in a storage system comprising a flash memory with a large capacity, the process for saving the management information stored in the main memory to the flash memory takes time.

Furthermore, a secondary power source comprising a capacitor and a battery is provided as a power holding circuit in the storage system in preparation for an unexpected power shutdown. Then, when an unexpected power shutdown occurs, the storage system uses the power from the secondary power source to save the management information stored in the main memory to the flash memory. Therefore, the capacity of the secondary power source (for example, the capacitance of the capacitor) must also be increased in line with an increase in the data size of the management information.

The problems described hereinabove can occur in all types of storage systems, which comprise storage other than flash memory, and which are designed to save data from the memory of the storage control apparatus to the storage.

Accordingly, an object of the present invention is to shorten the time it takes for the process of saving data stored in the memory of a storage control apparatus from the storage control apparatus to a storage.

Furthermore, another object of the present invention is to suppress an increase in the capacity of the secondary power source.

Solution to Problem

A storage system according to an embodiment of the present invention comprises a storage comprising a nonvolatile storage medium, and a storage control apparatus for carrying out the input/output of data to/from the storage. The storage control apparatus comprises a memory for storing management information, which is information used in inputting/outputting data to/from the storage, and a control part for controlling access to the storage. The control part stores management information, which is stored in the memory, in the storage as a base image, and when the management information is updated after the base image has been stored in the above-mentioned storage, creates a journal comprising information related to this update, and stores the journal in the above-mentioned storage as a journal group which is configured from multiple journals. The journal may comprise post-update information with respect to an updated location in the management information, or may comprise pre-update information with respect to an update location in the management information.

In the preferred embodiment, the storage system may further comprise a secondary power source for supplying power to the memory and the control part when the supply of power from a primary power source, which is a power source of the storage system, is shut off. The management information may comprise a data logical address-physical address translation table. The data logical address-physical address translation table may comprise a corresponding relationship between a physical address, which is associated with an area in the above-mentioned storage, and a logical address, which is associated with this physical address. The nonvolatile storage medium may be a flash memory chip. The storage may be a flash memory comprising one or multiple flash memory chips. The control part, in a case where the supply of power from the primary power source is shut off and there exists a journal that was created in the memory, may use the secondary power source to (1) store the relevant journal in the storage as a journal group, (2) restore the base image, which is being stored in the storage, to the memory, and thereafter, (3) reflect the above-mentioned journal group, which is stored in the storage, in the base image, and restore the management information to memory in accordance therewith.

BRIEF DESCRIPTION OF DRAWINGS

FIG. 12 shows an example of a flowchart of a process for restoring data, which was saved to the flash memory, to the main memory when power is turned on.

DESCRIPTION OF THE EMBODIMENT

A number of examples of the present invention will be explained below.

Furthermore, in the respective examples that follow, the storage is a flash memory, but the present invention is not limited to this, and, for example, the storage (nonvolatile physical storage medium) may be configured from another nonvolatile storage medium.

Further, in the following explanation, various types of information may be explained using the expression "xxx table", but the various information may also be expressed using a data structure other than a table. To show that the various information is not dependent on the data structure, "xxx table" can be called "xxx information".

EXAMPLE 1

Figure 1:
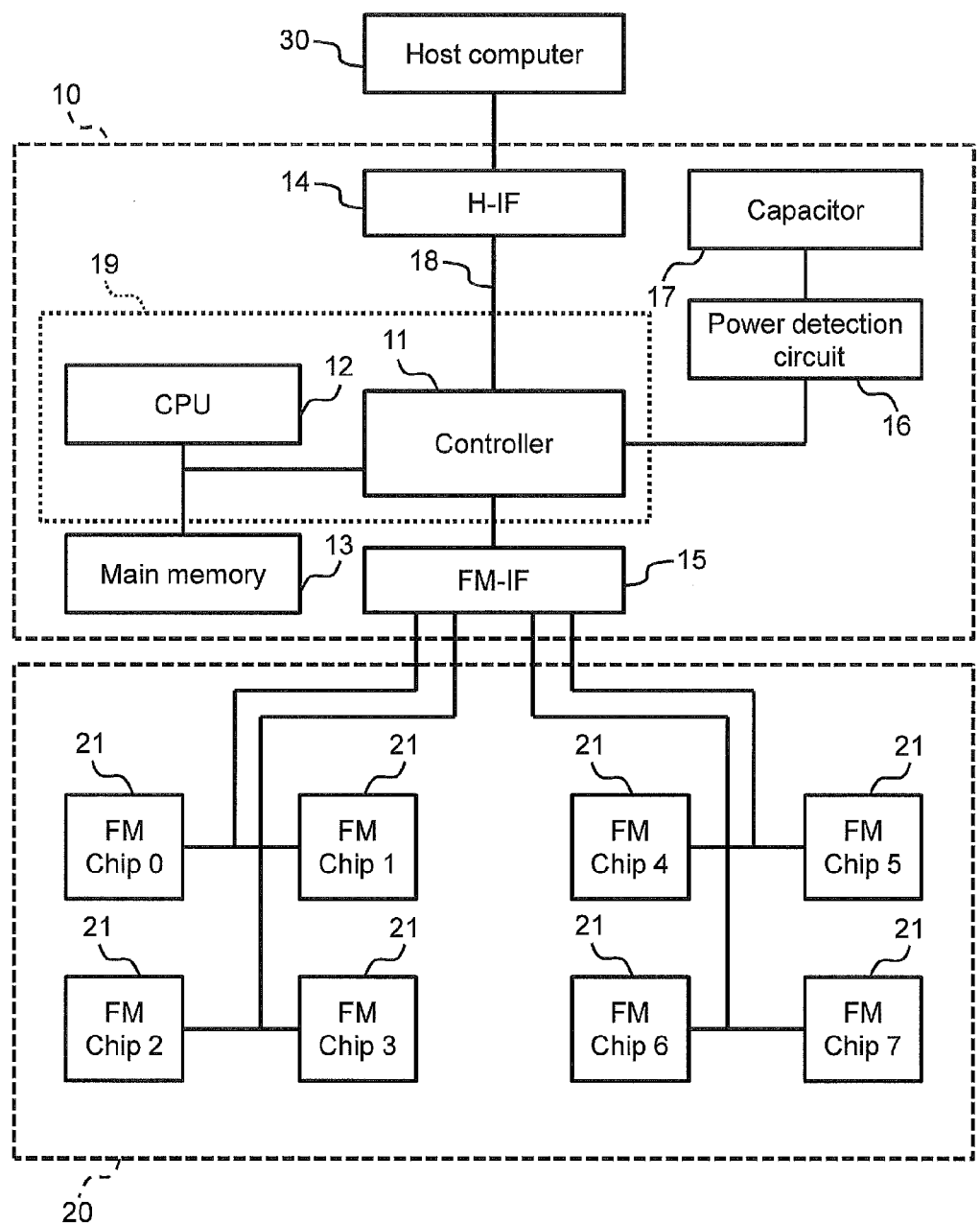
FIG. 1 shows the configuration of a storage system related to first example of the present invention.

FIG. 1 shows the configuration of a storage system related to a first example of the present invention.

A storage system, for example, comprises a storage control apparatus 10, and a flash memory 20. A host computer 30 is communicatably coupled to the storage control apparatus 10. Another type of higher-level apparatus, such as another storage system, may be coupled to the storage control apparatus 10 either instead of or in addition to the host computer 30.

The host computer 30, for example, writes data to the flash memory 20 and reads data from the flash memory 20 by sending write and read (may be referred to as "I/O" hereinafter) commands to the storage control apparatus 10.

The flash memory 20, for example, is configured from either one or multiple flash memory chips (referred to as "FM chip" hereinafter) 21. The FM chip 21 is a so-called nonvolatile semiconductor memory, and can retain data even when power is not being supplied. Each memory cell of the FM chip, for example, is a MLC (Multi-Level Cell), but another type of memory cell may be used.

The storage control apparatus 10, for example, comprises a host interface (referred to as "H-IF" hereinafter) 14, a control part 19, a main memory 13, a power detection circuit 16, a capacitor 17, and a flash memory interface (referred to as "FM-IF" hereinafter) 15, and these respective components are coupled together via a bus 18. The control part 19 comprises a CPU (Central Processing Unit) 12, and a controller 11.

The CPU 12 is a processor for controlling the storage control apparatus 10 as a whole, and executes a computer program (referred to as "program" hereinafter) stored in the main memory 13. Various types of functions, which will be described further below, are realized in accordance with this.

The controller 11 receives an I/O command from the host computer 30 or the like via the H-IF 14. The controller 11, based on the received I/O command, sends an I/O command for either writing or reading data in accordance with this I/O command to either the data write-destination or read-source FM chip 21 via the FM-IF 15. That is, the controller 11 carries out data I/O with respect to the FM chip 21. The controller 11 operates under the control of the CPU 12. Furthermore, in the FIG. 1, the controller 11 and the CPU 12 are configured separately, but, for example, the controller 11 and the CPU 12 may be configured using a single LSI (Large-scale Integrated Circuit). Furthermore, the functions of the controller 11 may be realized using one or more CPUs 12.

The main memory 13 temporarily stores a program, which is executed by the CPU 12, and data. The main memory 13, for example, is configured using a DRAM (Dynamic Random Access Memory), which is a volatile memory. Therefore, data stored in the main memory 13 will disappear when power is not supplied to the main memory 13.

The H-IF 14 is coupled to the host computer 30, and sends and receives an I/O command and other such data to and from the host computer 30. The H-IF 14, for example, is a SATA (Serial Advanced Technology Attachment), a SAS (Serial Attached SCSI) or other such interface.

The capacitor 17 stores power from the power source (for example, a commercial power source) of the storage control apparatus 10 when the power to the storage control apparatus 10 is on, and discharges the stored power when the power to the storage control apparatus 10 is off. The discharged power is used to save the data in the main memory 13 to the flash memory 20. For this reason, the discharged power is supplied to the main memory 13 and a device (for example, the CPU 12) for saving the data from the main memory 13.

The power detection circuit 16 monitors the power status of the storage control apparatus 10. When the power to the storage control apparatus 10 unexpectedly shuts off, the power detection circuit 16 causes the power stored in the capacitor 17 to discharge, and, in addition, notifies the controller 11 to the effect that the storage control apparatus 10 power unexpectedly shut off.

Figure 2:
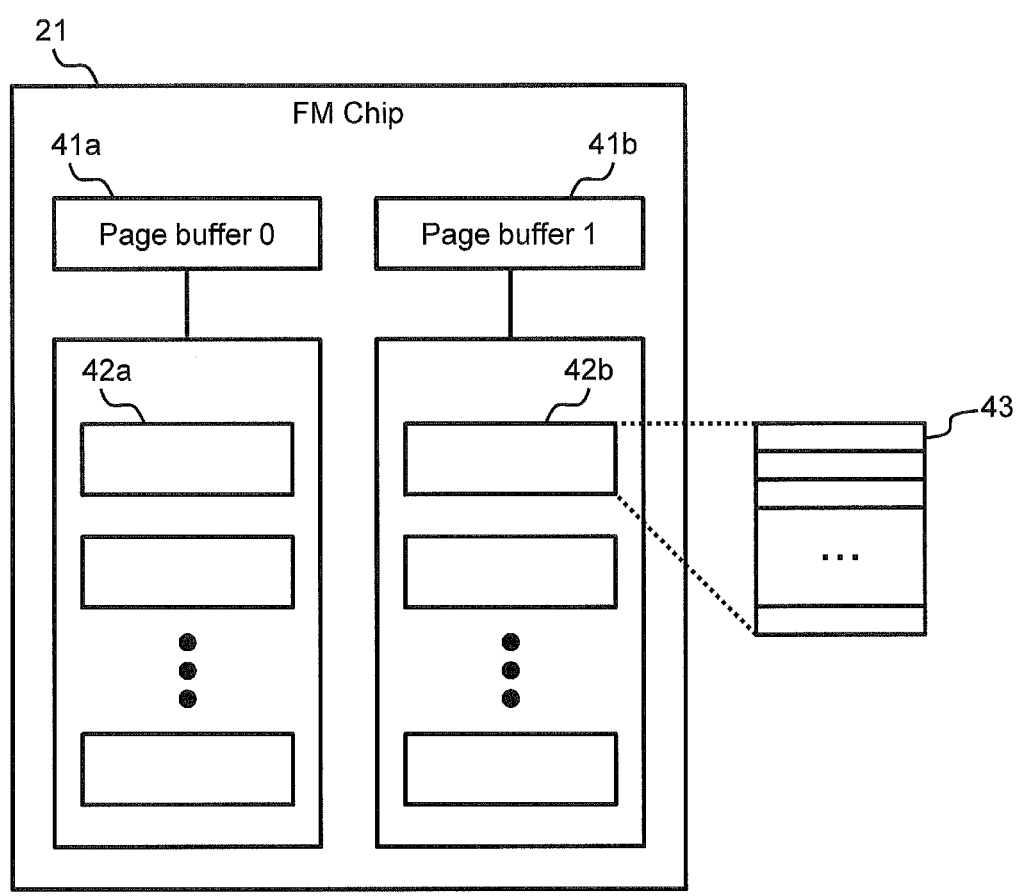
FIG. 2 shows the internal configuration of a flash memory chip.

FIG. 2 shows the internal configuration of the flash memory chip.

A single FM chip 21 is configured from either one or two or more page buffers 41, and multiple physical blocks 32.

The page buffer 41 temporarily stores the data (data, which is either written or read in units of pages) targeted by an I/O command received from the storage control apparatus 10. Then, the data stored in the page buffer 41 is written to a physical page 43 in the case of write-target data, and is transferred to the storage control apparatus 10 in the case of read-target data.

A physical block 42 is configured using multiple physical pages 43. The FM chip 21 either writes or reads data in units of physical pages 43, and erases data in units of physical blocks 42. Furthermore, the FM chip 21 cannot overwrite data stored in a physical page 43 with other data. Therefore, when overwriting data stored in the physical page 43 with other data, the data must be written to the physical page 43 after first erasing all the data in the physical block 42 that comprises the physical page 43. It depends on the type of the FM chip 21, but, generally speaking, the size of the physical page 43 is around 2 Kbytes, 4 Kbytes, or 8 Kbytes, and the number of physical pages 43 configuring the physical block 42 is around either 128 or 256.

Figure 3:
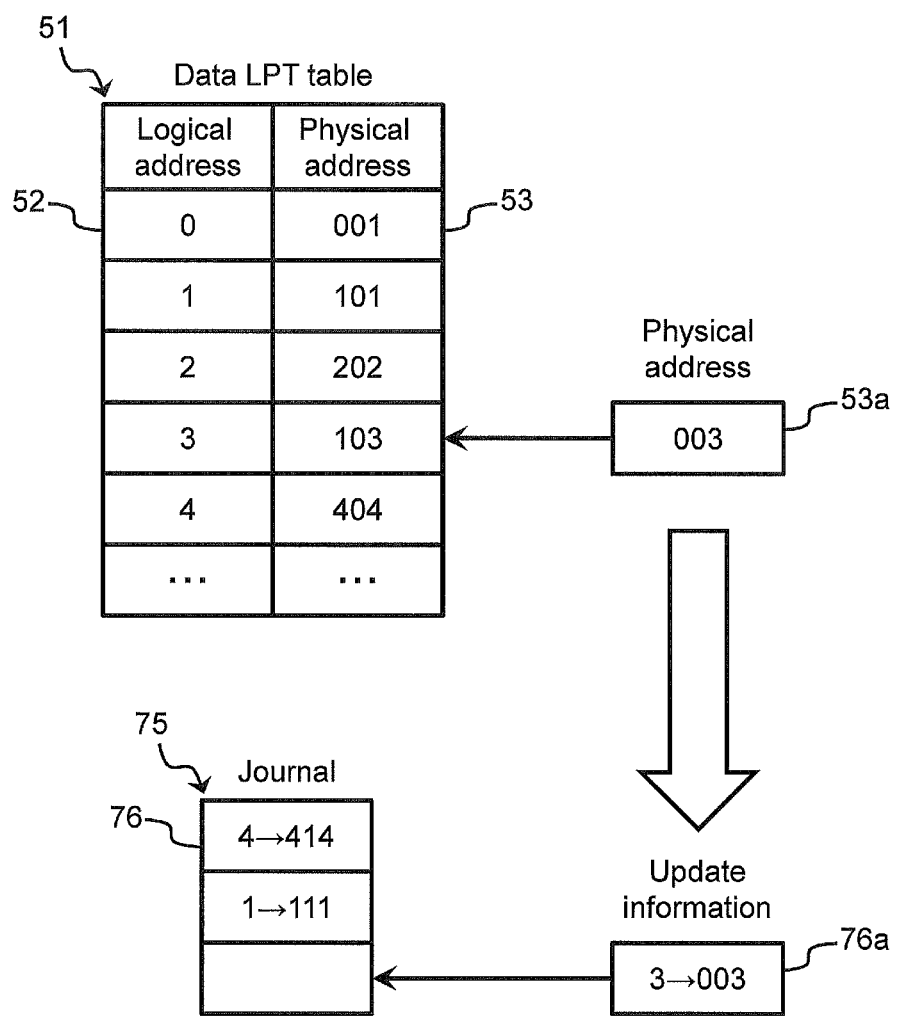
FIG. 3 shows an overview of an update of a data logical address-physical address translation (LPT) table.

The storage control apparatus 10 comprises management information, which is information used for data input/output to/from the flash memory 20. The management information is a data logical address-physical address translation (referred to as "LPT" hereinafter) table, which is for showing the corresponding relationship between a logical address of the main memory 13. This data LPT table, for example, is updated as shown in FIG. 3. The management information is not limited to the LPT table. For instance, the management information may be information which represents correspondence relationship between the logical volume and the RAID group (which logical volume is based on which RAID group) or information which represents correspondence relationship between the RAID group and the FM modules (which RAID group is comprised of which plurality of FM modules).

FIG. 3 shows an overview of the updating of the data logical address-physical address translation (LPT) table.

The data LPT table 51, for example, stores the corresponding relationship between a logical address 52 of a user data 50 and a physical address 53 of a user data 50. The user data 50 is the data, which is either written to the flash memory 20 or read from the flash memory 20 in accordance with an I/O command from the host computer 30. In this example, a post-update portion (a set comprising a logical address and a post-update physical address corresponding to this logical address) in the data LPT table 51 is the target of a journal 75. However, the present invention is not limited to this. For example, a post-update portion of another LPT table may be regarded as the target of a journal 75, or set data comprising an ordinary data storage-destination address and a data value may be regarded as the target of the journal 75 instead of the LPT table.

Update information 76 comprises information related to an update of the data LPT table 51, and is equivalent to the post-update portion of the data LPT table 51. The update information 76, for example, comprises a set of a logical address 52 and a post-update physical address 53. The update information 76, for example, is a transaction log of the data LPT table 51. The update information 76 is created each time the data LPT table 51 is updated. Furthermore, the update information 76 may also store an update time, which is the time at which the data LPT table 51 was updated.

The journal 75 is configured from either one or multiple pieces of update information 76. When the update information 76 is created, this information 76 is appended at the end of the journal 75. Therefore, the journal 75 stores the update information 76 in sequence from older information to newer information. Because the update information 76 is created frequently, it is preferable that the journal 75 be stored in the main memory 13, which has a fast access speed.

A specific example of when the update information 76 is appended to the journal 75 will be described below using FIG. 3. First of all, it is supposed that the control part 19 updates a physical address 53 corresponding to a logical address 52 "3" of the data LPT table 51 from "103" to "003". At this time, the control part 19 creates update information 76a comprising "3->003", which denotes that the physical address 53 corresponding to the logical address 52 "3" has been changed to "003". Then, the control part 19 appends the created update information 76a to the end of the journal 75.

In accordance with this, an update history of the data LPT table 51 is stored in the journal 75. Furthermore, the above-mentioned updating of the data LPT table 51, the creating of the update information 76, and the appending of the update information 76 to the journal 75 are carried out by the control part 19 of the storage control apparatus 10.

Figure 4:
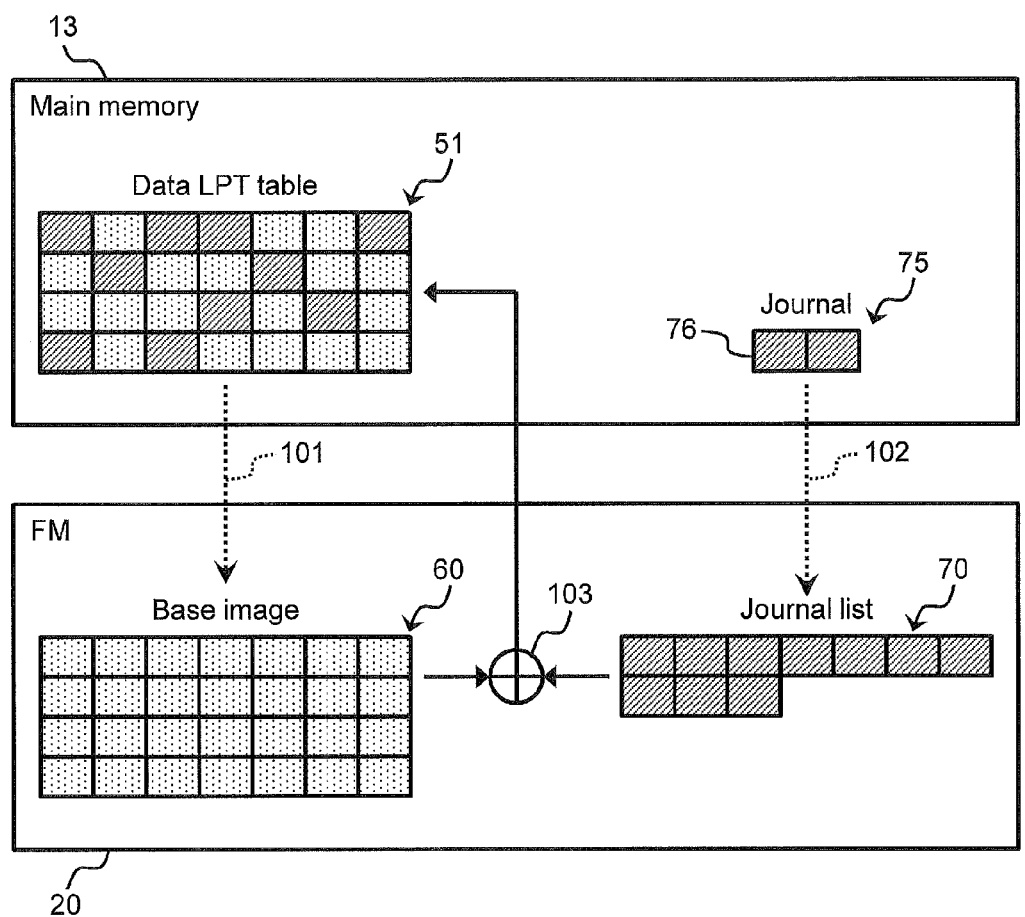
FIG. 4 shows an example of when the data LPT table is restored.

FIG. 4 shows an example of when the data LPT table is restored.

The data logical address-physical address translation table 51 and the journal 75 are stored in the main memory 13. A base image 60 and a journal list 70 are stored in the flash memory 20.

The journal 75 stored in the main memory 13 is destaged to the journal list 70 stored in the flash memory 20 at a certain timing (102). At this time, the journal 75 is appended to the end of the journal list 70. The certain timing, for example, is the time when the journal 75 has reached a prescribed amount of data and/or the time when a power shutdown process has commenced. Furthermore, destaging refers to storing data that has been stored in the main memory 13 to the flash memory 20.

The journal list 70 stores the journals 75 as a list in update time sequence (does not necessarily have to be the update time sequence). That is, the update information 76 is stored in the journal list 70 in sequence from older information to newer information. The journal list 70 is stored in the flash memory 20, and as such does not disappear even when the storage system power is shut off.

The base image 60 is the data of the entire data LPT table 51 at a certain time (this will be regarded as the "first time") that has been destaged to the flash memory 20 (101). Therefore, the data LPT table 51 of the first time can be restored using the base image 60. However, destaging the entire data LPT table 51 of every time as a base image 60 requires some time. Consequently, there is the likelihood that the power to the storage system will be shutoff during the destaging of the data LPT table 51 as a base image 60. In this case, the data LPT table 51 will not be able to be restored using only the base image 60.

Accordingly, in this example, the control part 19 does not destage the entire data LPT table 51 at every time to the flash memory 20 as the base image 60, but rather destages the entire data LPT table 51 at the first time as the base image 60, and thereafter destages a journal 75, which corresponds to the difference with the data LPT table 51 at the first time, to the journal list 70. The control part 19 restores a data LPT table 51, which has been updated subsequent to the first time, by using the base image 60 corresponding to the entire data LPT table 51 at the first time and the update information 76 in the journal list 70.

Specifically, the update information 76 of the data LPT table 51 is stored chronologically in the journal list 70. Therefore, in a case where a data LPT table 51, which was updated subsequent to the first time, is to be restored at a certain time (hereinafter, restoration time), the control part 19 reflects the update information 76, which was created at a time prior to but most closely approximating the restoration time (or was created at the restoration time), from the journal list 70 with respect to each logical address in the base image 60 corresponding to the entire data LPT table 51 at the first time. This makes it possible to restore the data LPT table 51 at the restoration time (for example, the time at which the power shut off) (103).

Figure 5:
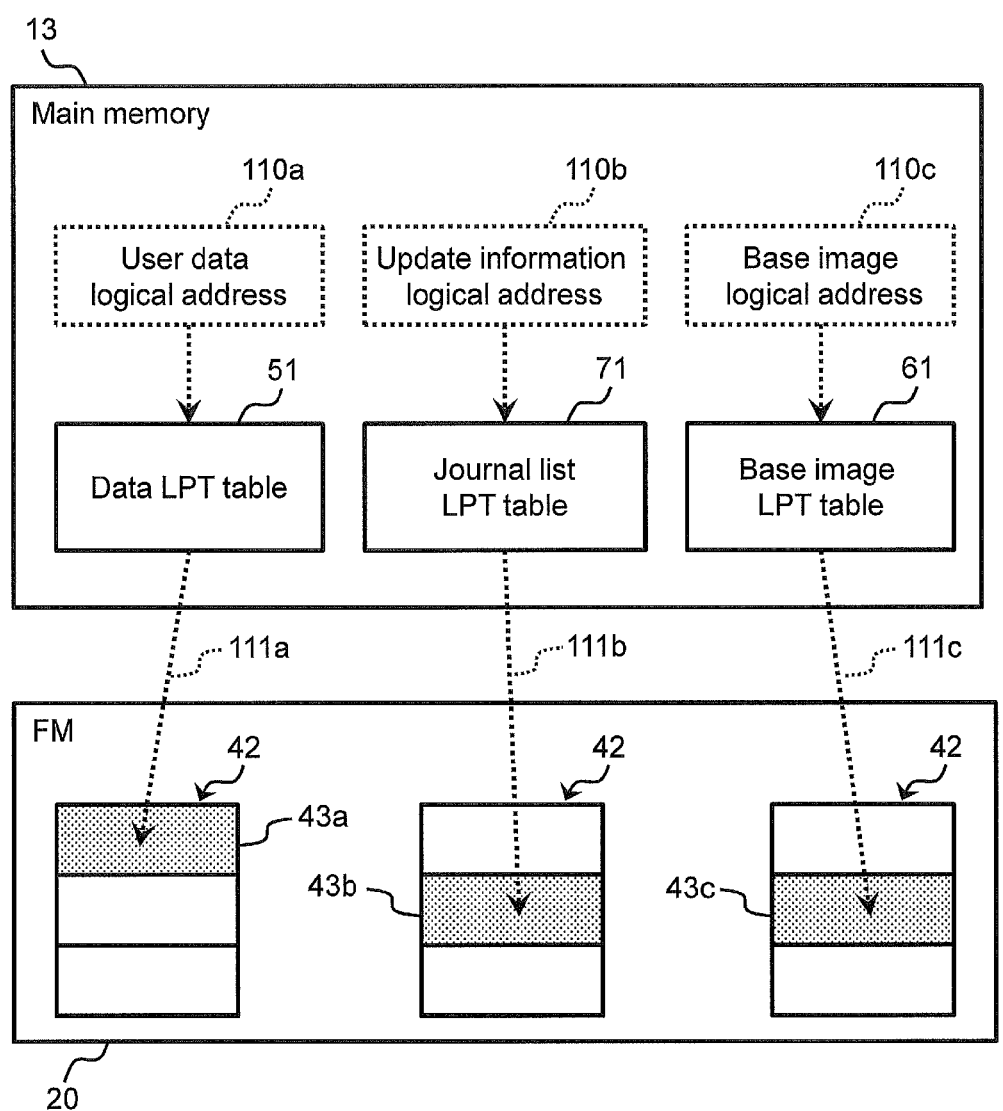
FIG. 5 shows the relationship between respective LPT tables and the flash memory.

FIG. 5 shows the relationship between respective LPT tables and the flash memory.

The storage control apparatus 10 comprises a journal list LPT table 71 and a base image LPT table 61 as LPT tables, in addition to the data LPT table 51.

The data LPT table 51, as was described hereinabove, stores the corresponding relationship between a logical address 52 and a physical address 53 of the user data 50 stored in the flash memory 20. For example, when the logical address 110a has been specified, the control part 19 references the data LPT table 51, identifies the physical address 43a corresponding to the logical address 110a, and accesses the user data 50 stored in this physical address 43a (111a).

The journal list LPT table 71 stores the corresponding relationship between a logical address and a physical address of the journal list 70 stored in the flash memory 20. For example, when the logical address 110b is specified, the control part 19 references the journal list LPT table 71, identifies the physical address 43b corresponding to the logical address 110b, and accesses the update information 76 stored in this physical address 43b (111b).

The base image LPT table 61 stores the corresponding relationship between a logical address and a physical address of the base image 60 stored in the flash memory 20. For example, when the logical address 110c is specified, the control part 19 references the base image LPT table 61, identifies the physical address 43c corresponding to the logical address 110c, and accesses the base image 60 stored in this physical address 43c (111c).

Furthermore, the logical address may be an independent address system for each LPT table 51, 61 and 71 as shown in FIG. 5, or may be a successive address system formed from the LPT tables 51, 61 and 71.

Figure 6:
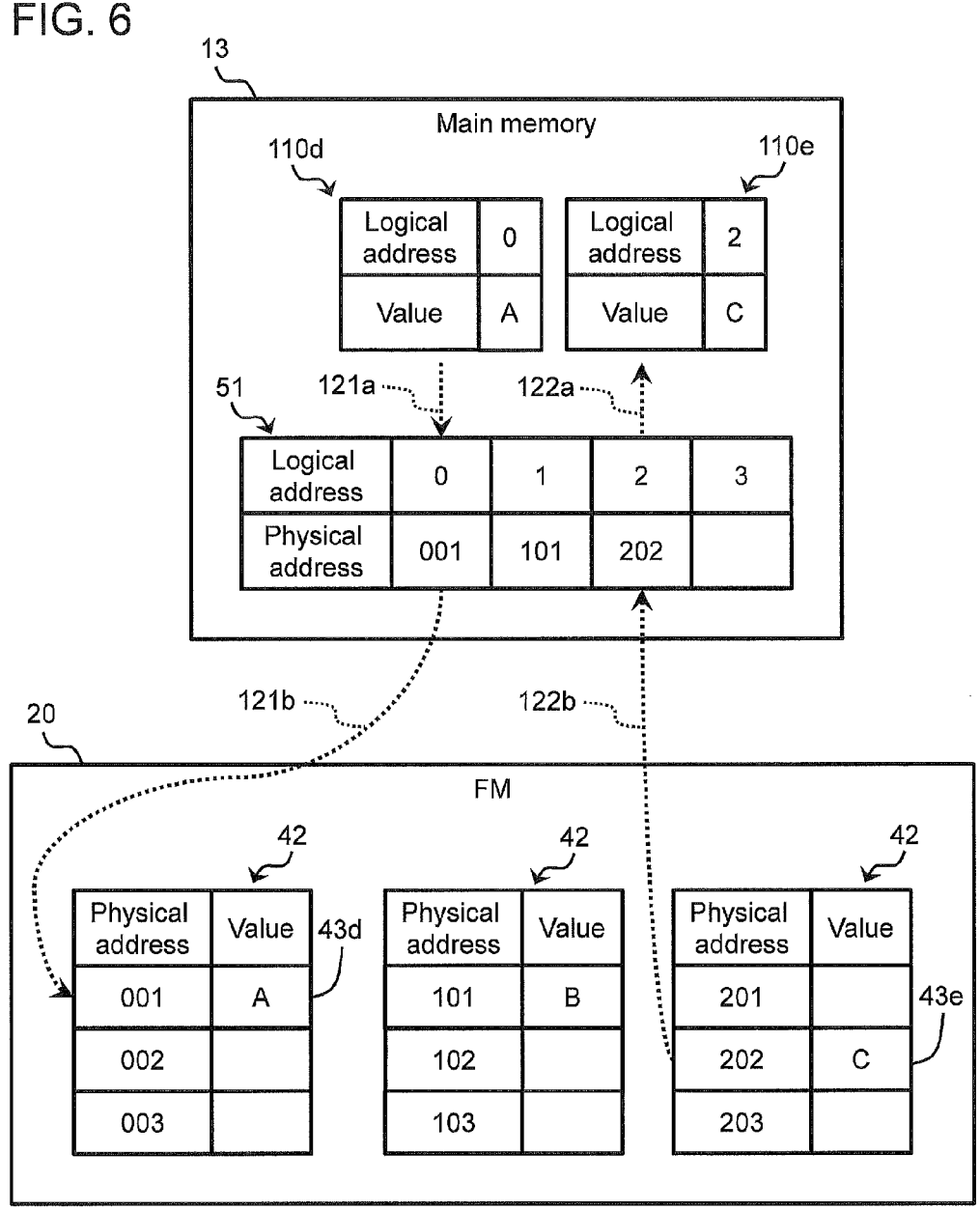
FIG. 6 shows a specific example of the relationship between a logical address of the main memory and a physical address of the flash memory.

FIG. 6 shows a specific example of the relationship between logical addresses of the main memory and physical addresses of the flash memory.

For example, upon receiving a write command (110d) for writing a value "A" to an area to which the logical address "0" belongs (121a), the control part 19 references the data LPT table 51 and identifies the physical address "001" corresponding to the logical address "0". Then, the control part 19 writes the value "A" to a physical area (physical page) (43d) of the physical address "001" of the flash memory 20.

Furthermore, for example, upon receiving a read command for reading a value from an area to which the logical address "2" belongs, the control part 19 references the data LPT table 51 and identifies the physical address "202" corresponding to the logical address "2". Then, the control part 19 reads a value "C" from a physical area (43e) of the physical address "202" of the flash memory 20 (122b), and returns this value to the command source (122a).

Figure 7:
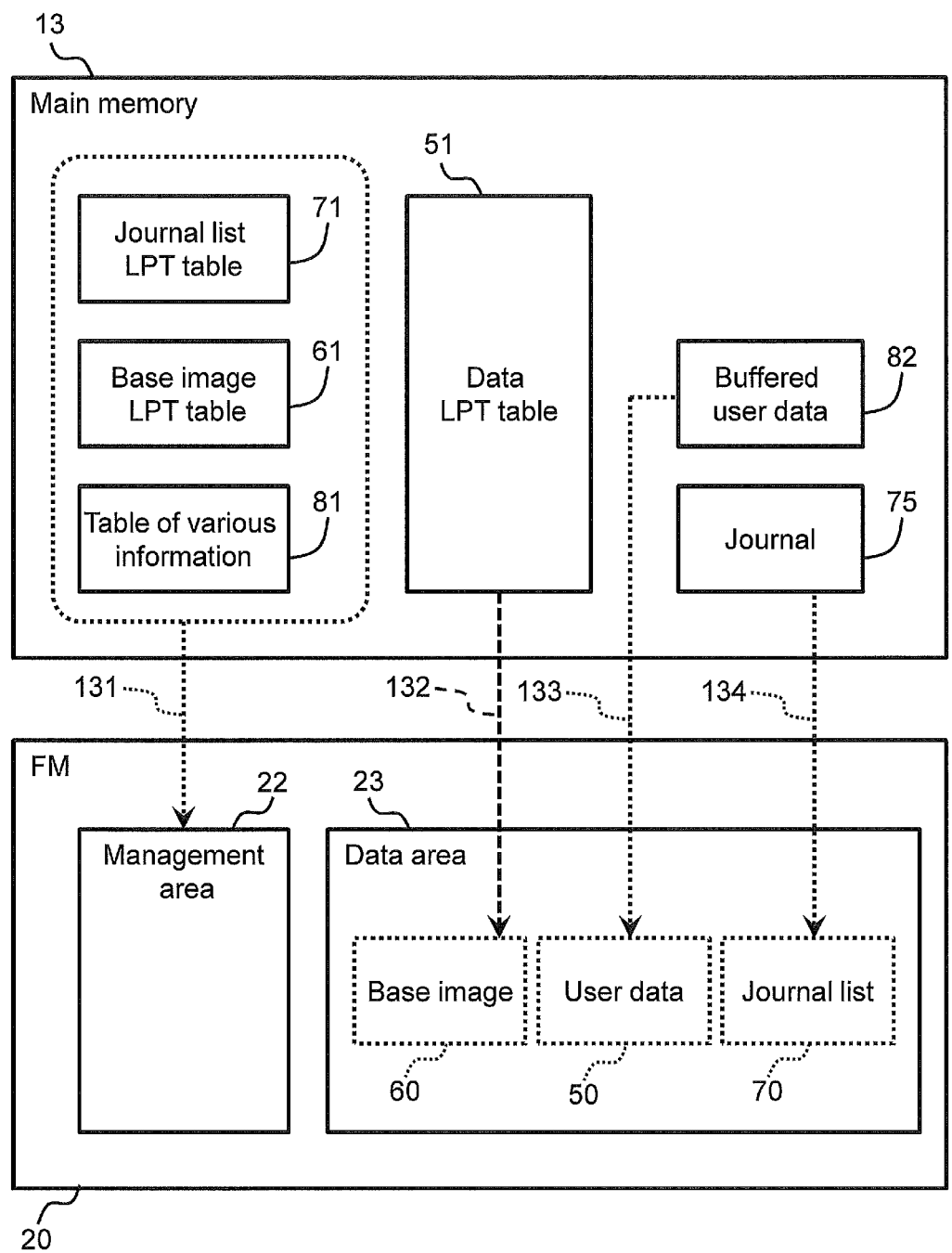
FIG. 7 shows an overview of an operation in a case where main memory data is saved to the flash memory.

FIG. 7 shows an overview of an operation in a case where main memory data is saved to the flash memory.

The main memory 13 stores the data LPT table 51, the base image LPT table 61, the journal list LPT table 71, and a table of various information 81. In addition, the main memory 13 stores buffered user data 82 and a journal 75.

A management area 22 and a data area 23 are reserved beforehand in the flash memory 20. The management area 22, for example, may be a set of redundant areas of the respective physical pages 43. The data area 23, for example, may be a set of user areas of the respective physical pages 43. Each physical page 43 may be configured from a user area in which data such as user data 50, a journal list 70, and a base image 60 are stored, and a redundant area in which information other than this type of data is stored. The present invention is not limited to this, and, for example, the management area 22 may be configured using multiple certain physical blocks 42, and the data area 23 may be configured using multiple other physical blocks 42.

Information for managing the data stored in the data area 23 is stored in the management area 22. For example, a journal list LPT table 71, a base image LPT table 61, and a table of various information 81 are stored in the management area 22. The information table 81, for example, may be a table for showing the corresponding relationship between one or more FM chips 21 and a logical volume (for example, a logical volume provided to the host computer 30).

Various types of data are stored in the data area 23. For example, user data 50, a journal list 70, and a base image 60 are stored in the data area 23. The reason for storing the base image 60, which is image data of the data LPT table 51, in the data area 23 instead of in the management area 22 is because of the large data size of the data LPT table 51.

An overview of the process for saving the data of the main memory 13 to the flash memory 20 will be described below using FIG. 7.

When the power to the storage system 1 is shut off, a process for queuing the data stored in the main memory 13 to the flash memory 20 commences.

For example, the control part 19 destages the journal list LPT table 71, the base image LPT table 61, and the table of various information 81 stored in the main memory 13 to the management area 22 of the flash memory 20 (131).

The control part 19 references the data LPT table 51 and destages the buffered user data 82 in the main memory 13 to the data area 23 (133). The user data inside the data area 23 is shown as "user data 50". At this time, in a case where the data LPT table 51 has been updated, the control part 19 creates update information 76 related to this update, and appends this update information 76 to the journal 75.

The control part 19 destages the journal 75 stored in the main memory 13 to the journal list 70 of the data area 23 (134).

The control part 19 occasionally (for example, regularly) destages the data LPT table 51 to the data area 23 as the base image 60 while the power to the storage system is being turned on (132). For this reason, the control part 19 does not destage the data LPT table 51 when this power is shut off.

According to the processing described hereinabove, when the power to the storage control apparatus 10 is shut off, the data in the main memory 13 is saved to the flash memory 20.

Figure 8:
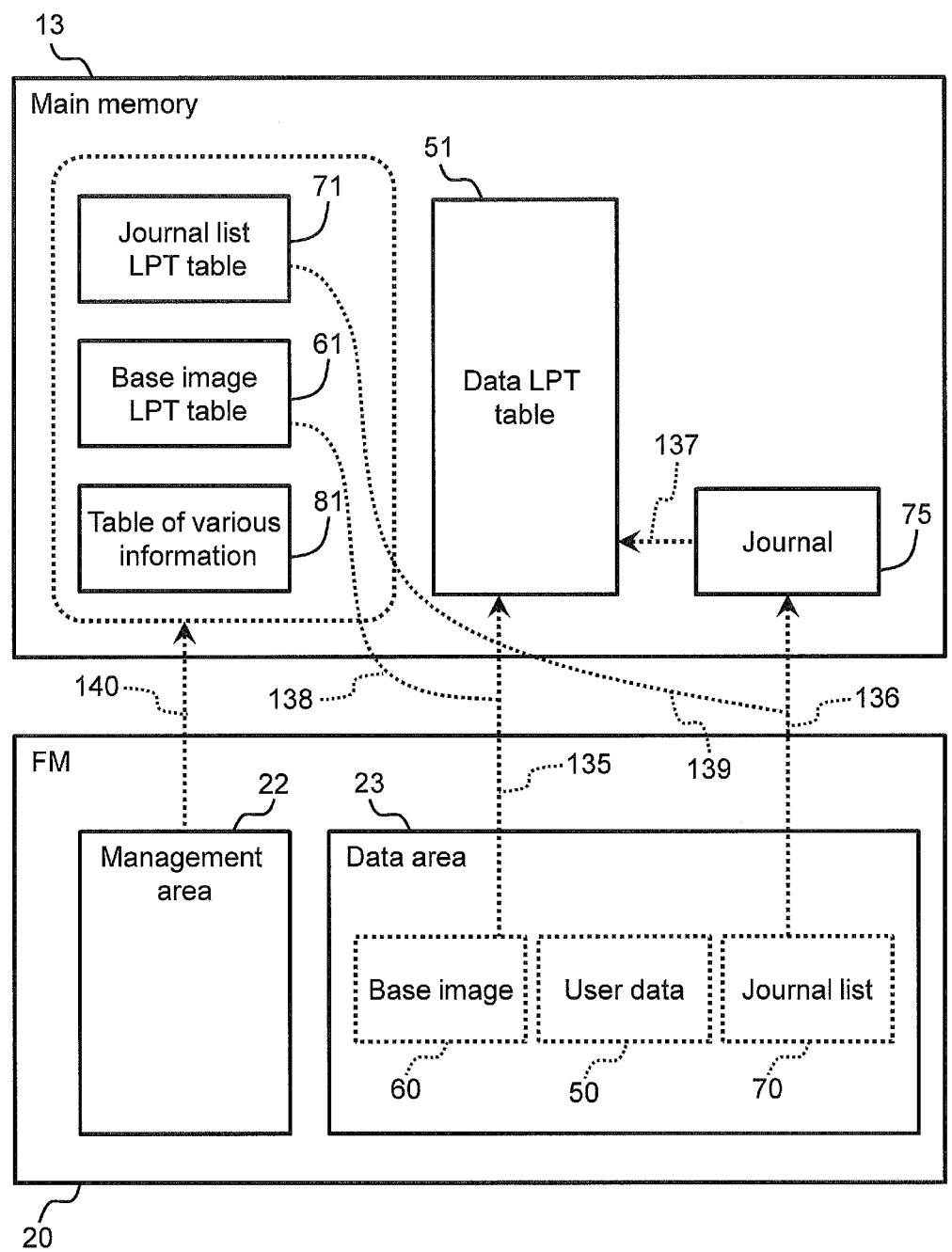
FIG. 8 shows an overview of an operation in a case where data saved to the flash memory is restored to the main memory.

FIG. 8 shows an overview of an operation in a case where data, which has been saved to the flash memory, is restored to the main memory.

When the storage system power is shut off, the journal list LPT table 71, the base image LPT table 61, and the table of various information 81 are stored in the management area 22. The base image 60, the user data 50, and the journal list 70 are stored in the data area 23.

The respective LPT tables are restored as follows when the storage system 1 power is turned on.

First, the control part 19 reads the journal list LPT table 71, the base image LPT table 61, and the table of various information 81 from the management area 22 to the main memory 13 (140). This restores the journal list LPT table 71, the base image LPT table 61, and the table of various information 81 to the main memory 13.

Then, the control part 19 references the base image LPT table 61 (138), identifies the location of the base image 60 in the data area 23, and reads the base image 60 from the identified location to the main memory 13 (135). This restores the data LPT table 51 to the main memory 13.

Then, the control part 19 references the journal list LPT table 71 (139) and identifies the locations of the journals 75, which are arranged in sequence from the oldest update time in the journal list 70. The control part 19 reads the journals 75 to the main memory 13 from the identified locations in sequence from the oldest update time, and sequentially reflects the update information 76 stored in these journals 75 to the data LPT table 51 (137).

This restores the data LPT table 51 at the time the power was shut off on the basis of the base image 60.

Figure 9:
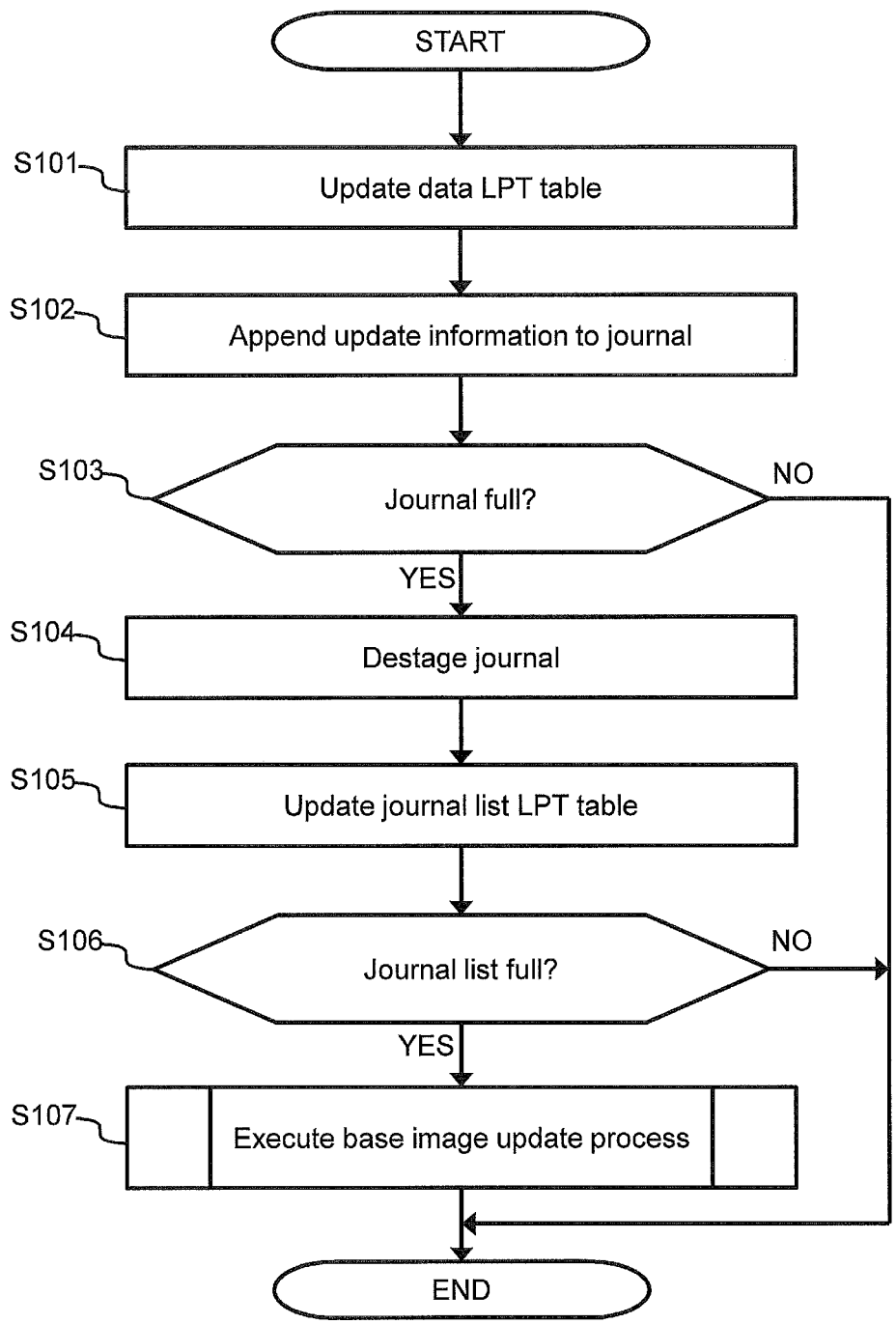
FIG. 9 shows an example of a flowchart of a process for recording update information of the data LPT table.

FIG. 9 shows an example of a flowchart of a process for recording data LPT table update information.

The control part 19 updates the data LPT table 51 (S101).

The control part 19 creates the post-update information thereof (the update information 76 comprising a set 9 of the logical address and the post-update physical address corresponding to this logical address), and appends the update information 76 to the end of the journal 75 (S102).

The control part 19 determines whether or not it is necessary to destage the journal 75 (S103). For example, the control part 19 may determine to carry out destaging in a case where the number of pieces of update information 76 stored in the journal 75 have become equal to or larger than a prescribed number. Or, the control part 19 may carry out destaging in a case where a prescribed period of time has elapsed since the most recent time at which the journal 75 was destaged (the most recent time at which the update information 76 was appended to the journal 75).

In a case where the determination is that it is not necessary to destage the journal 75 (S103: NO), the control part 19 ends this processing.

In a case where the determination is that it is necessary to destage the journal 75 (S103: YES), the control part 19 destages the journal 75 to the journal list 70 inside the flash memory 20 (S104).

The control part 19 updates the information related to the destaged journal 75 in the journal list LPT table 71 (S105).

The control part 19 determines whether or not the journal list 70 is full of update information 76 (S106). For example, the control part 19 may determine that the journal list 70 is full of update information 76 when the number of pieces of update information 76 stored in the journal list 70 is equal to or larger than a prescribed number (referred to as "list upper limit number" hereinafter). Furthermore, the control part 19 may determine that the journal list 70 is full of update information 76 when a prescribed time has elapsed since the most recent time at which the journal 75 was destaged to the journal list 70. Furthermore, the control part 19 may determine that the journal list 70 is full of update information 76 when the current I/O load on the flash memory 20 is higher than a prescribed value.

In a case where the journal list 70 is not full (S106: NO), the control part 19 ends this processing.

In a case where the journal list 70 is full (S106: YES), the control part 19 executes a base image 60 update process, which will be described further below (S107).

Furthermore, this processing (the series of processes shown in FIG. 9) is repeatedly executed regularly (or irregularly) while the storage system 1 power is being turned on.

Furthermore, the control part 19 may erase all the update information 76 in the journal 75 in a case where the destaging of the journal 75 inside the main memory 13 to the journal list 70 inside the flash memory 20 has been completed. This makes it possible to prevent the same update information 76 as the destaged update information 76 from being destaged to the flash memory 20, and duplicate update information 76 from being stored in the flash memory 20. In a case where update information 76 that is the same as the destaged update information 76 remains inside the journal 75 when the journal 75 has been destaged, destaging for this update information 76 only may be skipped, or the same logical address as the logical address of the area in which the destaged update information 76 is stored may be specified, and this same update information 76 may be destaged.

Figure 10:
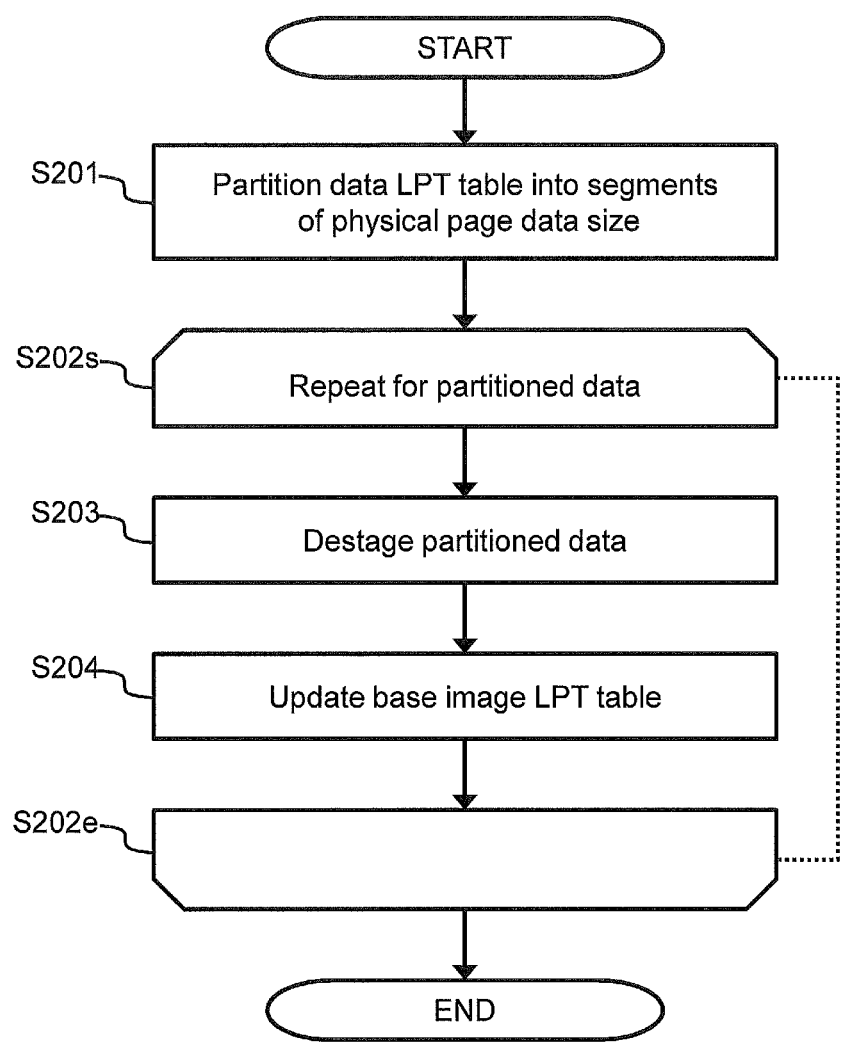
FIG. 10 shows an example of a flowchart of a base image update process.

FIG. 10 shows an example of a flowchart of a base image update process. This process corresponds to Step S107 of FIG. 9.

The control part 19 partitions the data LPT table 51 into segments of physical page 43 data size (S201).

The control part 19 repeatedly executes the processing from Step S202s through Step S202e for each piece of partitioned data (referred to as "partitioned data" hereinafter in the explanation of FIG. 10) (S202s).

The control part 19 destages the partitioned data to the flash memory 20 (S203).

The control part 19 updates the information related to the destaged partitioned data in the base image LPT table 61 (S204).

The control part 19 ends the processing after the processing of Steps S203 through S204 has been executed for all the partitioned data (S202e).

Figure 11:
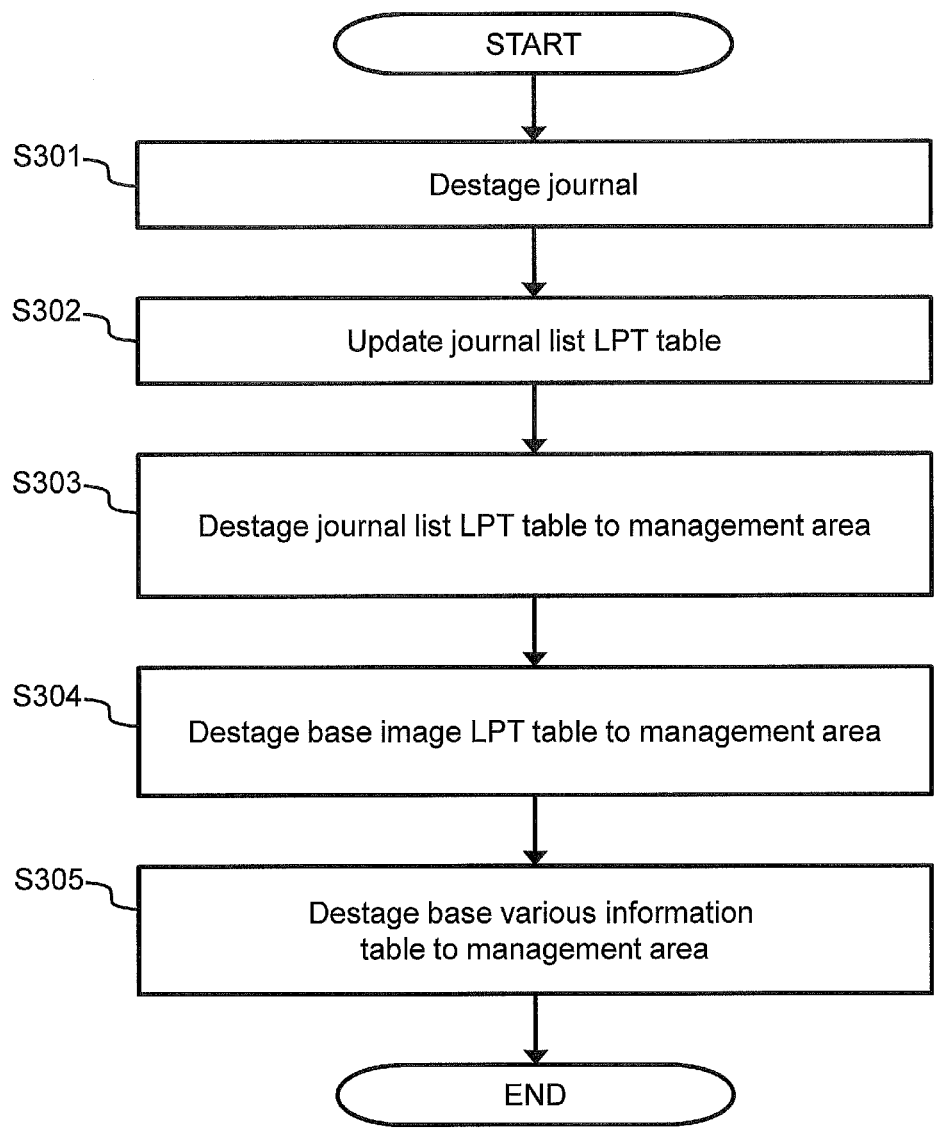
FIG. 11 shows an example of a flowchart of a process for saving data, which is being stored in the main memory, to the flash memory when power is shut off.

FIG. 11 shows an example of a flowchart of a process for saving data stored in the main memory to the flash memory when the power is shut off.

This process is executed either in a case where a power off command has been received from the host computer 30, or a case where an unexpected power shutdown (for example, a power outage) has occurred. Furthermore, in a case where an unexpected power shutdown has occurred, power off is detected by the power detection circuit 16, and power is temporarily supplied to the control part 19 and the main memory 13 from the capacitor 17. Then, this process is executed by the power detection circuit 16 notifying the control part 19 to the effect that a power shutdown has occurred.

The control part 19 destages (saves) the journal 75 stored in the main memory 13 to the data area 23 (S301).

The control part 19 updates the information related to the destaged journal 75 in the journal list LPT table 71 (S302).

The control part 19 destages (saves) the journal list LPT table 71 to the management area 22 (S303)

The control part 19 destages (saves) the base image LPT table 61 to the management area 22 (S304).

The control part 19 destages (saves) the table of various information 81 to the management area 22 (S305), and ends this processing.

Figure 12:
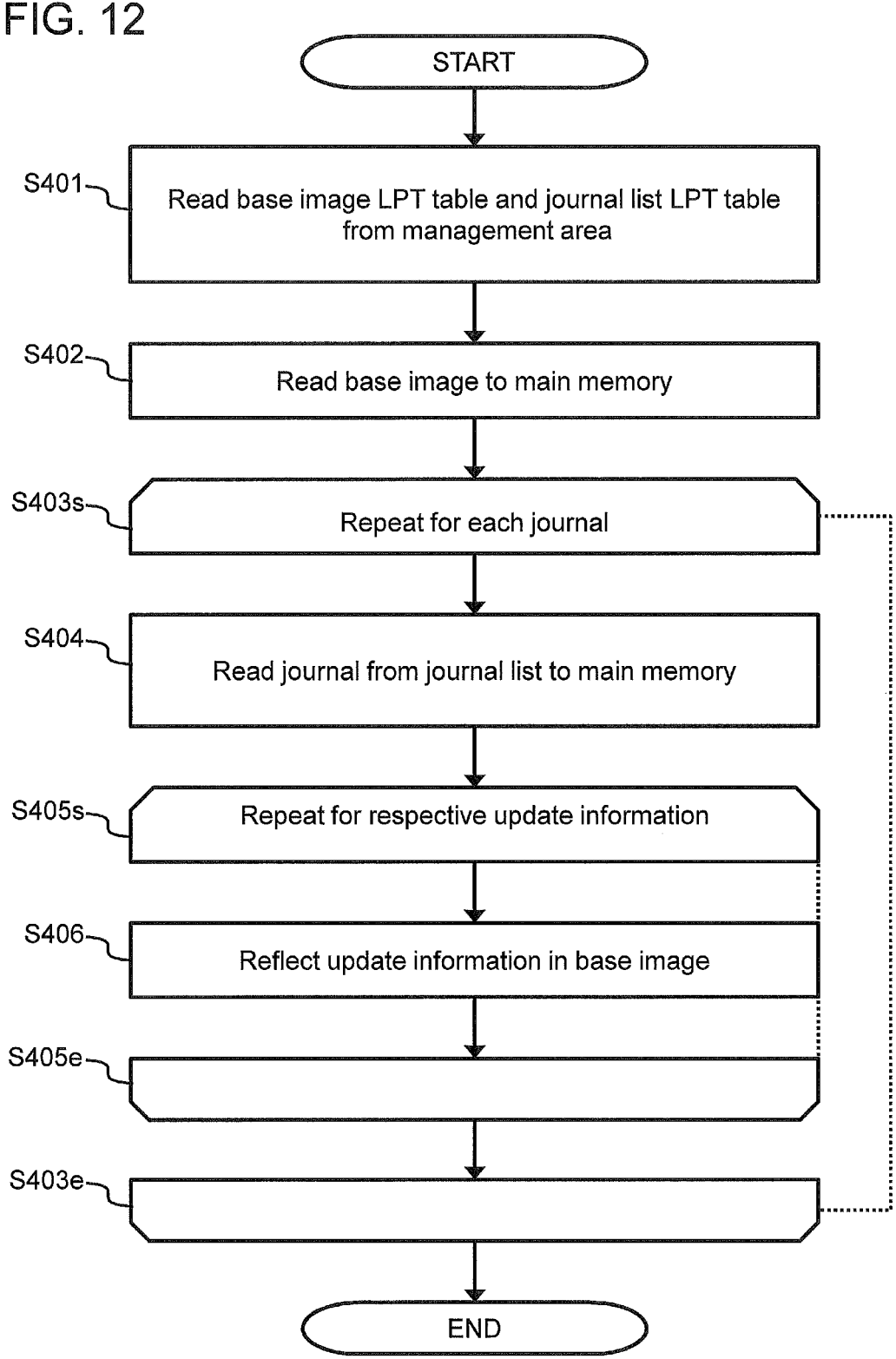

FIG. 12 shows an example of a flowchart of a process for restoring data saved in the flash memory to the main memory when power is turned on.

The control part 19 restores (reads) the journal list LPT table 71 and the base image LPT table 61 from the management area 22 to the main memory 13 (S401).

The control part 19 references the base image LPT table 61, reads the base image 60 from the data area 23, and restores the data LPT table 51 in the main memory 13 (S402).

The control part 19 repeats the processing from Step S403s through Step 403e in proportion to the number of journals included in the journal list 70 (S403s).

The control part 19 references the journal list LPT table 71, sequentially reads the journal 75 from the journal list 70 of the data area 23, and disposes the journal 75 in the main memory 13 (S404).

The control part 19 repeats the processing from Step S405s through Step 405e in proportion to the number of pieces of update information 76 included in the journal 75 (S405s).

The control part 19 sequentially extracts the update information 76 from the journal 75 from the oldest update time, and reflects this update information 76 in the base image 60 (S406). Specifically, the physical address of this update information 76 is overwritten in the base image 60 with the physical address corresponding to the logical address that is the same as the logical address of this update information 76.

The control part 19 ends this processing after reflecting all the update information 76 in the base image 60 (S405e, S403e).

According to this example, there is no need to destage the data LPT table 51 to the flash memory 20 when the power to the storage system 1 is shut off. This makes it possible to shorten the time required for destaging when the power is shut off.

That is, the data size of the data LPT table 51 becomes larger in accordance with an increase in the capacity of the flash memory 20. Consequently, destaging the entire data LPT table 51 in a large-capacity flash memory 20 takes a long time. In comparison to this, the total data size of the journal list LPT table 71, the base image LPT table 61, the buffered journal 75, and the user data 50 is smaller than the data LPT table 51 in a large-capacity flash memory 20. Therefore, according to this example, the time required for destaging when the power is shut off can be shortened more than in a case where the data LPT table 51 is destaged.

In addition, according to this example, the capacitance of the capacitor 17 can be decreased by shortening the time required for destaging when the power is shut off.

That is, in a case where an unexpected power shutdown occurs, the control part 19 must receive a supply of power from the capacitor 17 and destage the data in the main memory 13 to the flash memory 20. Therefore, the capacitor 17 is required to have at least enough capacitance to be able to ensure the time needed for destaging. According to this example, since the time required for destaging when the power is shut off can be shortened, the capacitance of the capacitor 17 can be reduced by that much.

Furthermore, according to this example, the data LPT table 51 can be stored in the data area 23 of the flash memory 20. This makes it possible to use the area of the flash memory 20 more efficiently than when the data LPT table 51 is stored in the management area 22. That is, in a case where the data LPT table 51 is stored in the management area 22 as in the past, the storage system must reserve a management area 22 that is equal to or larger than the maximum size that the data LPT table 51 can take in the flash memory 20. For this reason, a small size data LPT table 51 lowers the utilization efficiency of the flash memory 20 as a whole. However, according to this example, since the data LPT table 51 is stored in the data area 23 of the flash memory 20 as was described hereinabove, the flash memory 20 area can be used efficiently.

In addition, according to this example, even a case in which the capacity of the data area 23 of the flash memory 20 is expanded afterwards and the size of the data LPT table 51 increases can be handled easily. That is, when the data LPT table 51 is stored in the management area 22 as in the past, in a case where it is not possible to store a data LPT table 51 that is equal to or larger than the size of a reserved management area 22 and the capacity of the data area 23 of the flash memory 20 is expanded, the storage system must reconfigure the size of the management area 22 accordingly. However, according to this example, since the data LPT table 51 is stored in the data area 23 of the flash memory 20 as described hereinabove, there is no need to reconfigure the size of the management area 22 even when the size of the data LPT table 51 increases.

Furthermore, according to this example, the journal list 70, the base image 60, the user data 50, and the data LPT table 51 are managed using the same data area 23. This makes it possible to prolong the rewrite life of the flash memory 20 as a whole since wear leveling can be carried out for the entire data area 23. That is, the rewrite frequency per physical block in a small-size management area 22, for example, is higher than the rewrite frequency per physical block in a large-size data area 23 even when wear leveling is performed. For this reason, in a case where the data LPT table 51 is stored in a small-size management area 22 as in the past, the rewrite life of the management area 22 expires sooner than the rewrite life of the data area 23. That is, the rewrite life of the flash memory 20 as a whole is shortened. According to this example, since the journal list 70, base image 60, user data 50, and data LPT table 51 are managed using the same data area 23 as described hereinabove, thereby making it possible to carry out wear leveling for the entire data area 23, the rewrite life of the flash memory 20 as a whole can be prolonged.

EXAMPLE 2

In the first example, the number of pieces (or data size) of update information 76 capable of being stored in the journal list 70 is limited. Consequently, in a case where the data LPT table 51 has been completely destaged as the base image 60 (that is, a case in which the destaging of the data LPT table 51 has been completed), this journal list 70 becomes unnecessary. This is because there are no differences between the data LPT table 51 and the base image 60. For this reason, this journal list 70 is erased when the data LPT table 51 has been completely destaged as the base image 60. This destaging is started when journal list 70 becomes full. However, as shown in the first example, in a case where there is only one journal list 70, the journal 75 cannot be destaged while this destaging is being carried out.

Consequently, in this example, two journal lists are stored in the flash memory 20 (three or more journal lists may be stored). This example will be explained hereinbelow. In so doing, the points of difference with the first example will mainly be explained, and explanations of the points in common with the first example will either be simplified or omitted (The same will hold true for the examples that follow as well.).

Figure 13:
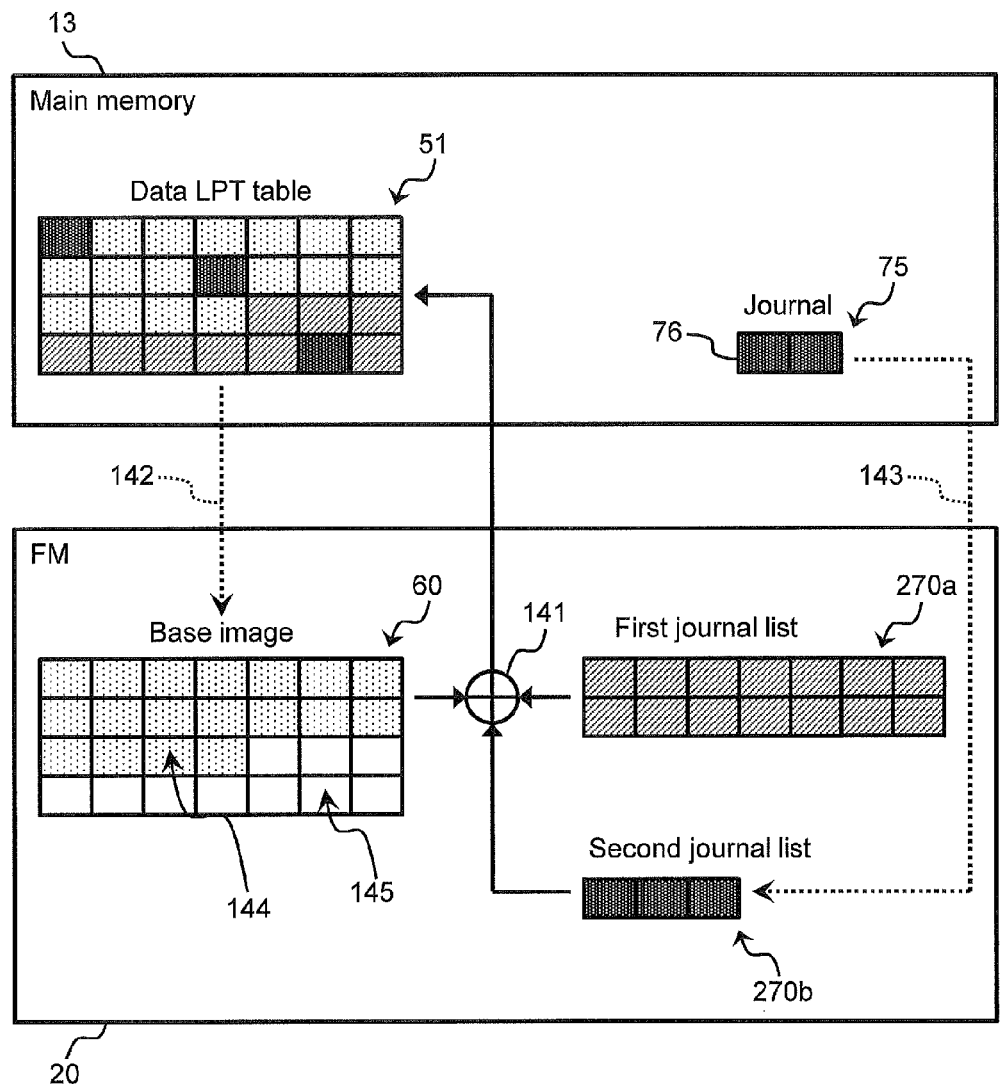
FIG. 13 shows a variation of when the data LPT table is restored.

FIG. 13 shows a variation of the restoration of the data LPT table.

A storage system related to the second example stores a base image 60, a first journal list 270*a*, and a second journal list 270*b* in the flash memory 20, and stores the data LPT table 51 in the main memory 13.

The destaging of the data LPT table 51 will be explained first.

When the first journal list 270*a* becomes full, the control part 19 starts destaging the data LPT table 51 as a base image 60 (142). Then, the control part 19 destages subsequent journals 75 to the second journal list 270*b* (143). That is, update information 76 up until prior to the start of the destaging of the data LPT table 51 is included in the first journal list 270*a*, and update information 76 after the start of the destaging of the data LPT table 51 is included in the second journal list 270*b*.

This makes it possible to destage a journal 75 (143) while the destaging of the data LPT table 51 (142) is being carried out.

The restoration of the data LPT table 51 will be explained next.

It is assumed here that the base image 60 is only destaged to the lightly shaded area 144. Furthermore, it is supposed that information denoting the stage of the base image 60 up to which destaging was completed is stored.

In accordance with this, first, the control part 19 reflects the update information 76 of the first journal list 270*a* (that is, the update information 76 created up until the start of the destaging of the data LPT table 51) in the unshaded area 145 of the base image 60 (the area corresponding to the area in which the data LPT table 51 is not being destaged). In addition, the control part 19 reflects the update information 76 of the second journal list 270*b* (that is, the update information 76 created after the start of the destaging of the data LPT table 51) in the entire base image 60. This makes it possible to restore the data LPT table 51 when the power has been shut off.

According to this example, a journal 75 can be destaged to the journal list even while the destaging of the data LPT table 51 is being carried out.

EXAMPLE 3

A third example will be explained hereinbelow. Furthermore, the third example is applicable to at least one of the first example or the second example.

In this example, the maximum number of pieces of update information 76 capable of being stored in the journal list 70 (referred as "list maximum number" hereinafter) can be configured. As was described using the first example, when the journal list 70 becomes full, the data LPT table 51 is destaged to the flash memory 20 as a base image 60. That is, when the list maximum number changes, the timing at which the data LPT table 51 is destaged also changes. The list maximum number, for example, is configured from the host computer 30 (or a storage system management computer (not shown in the drawing)).

Figure 14:
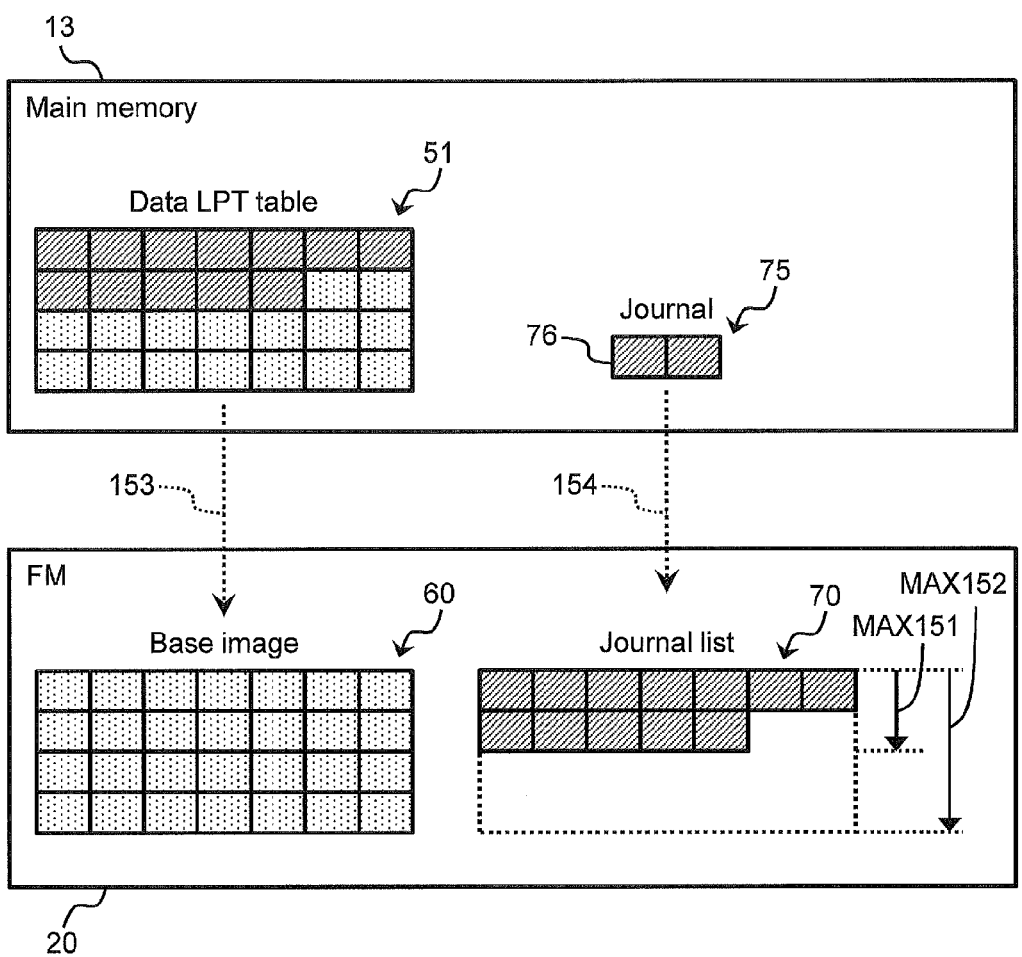
FIG. 14 shows an overview of an operation for changing the setting of a list maximum number of a journal list.

FIG. 14 shows an overview of an operation for changing the setting of the list maximum number of the journal list.

A case in which the list maximum number is configured to MAX 152 (a case where the list maximum number is large) will be compared to a case in which the list maximum number is configured to MAX 151 (a case where the list maximum number is small).

In the case of a large list maximum number, the frequency at which the data LPT table 51 is destaged decreases. That is, the I/O load on the flash memory 20 is small. However, since there is a lot of update information 76 stored in the journal list 70, restoration takes a long time. Furthermore, since the data size of the journal list 70 is large, a large area of the flash memory 20 is utilized.

Alternatively, in the case of a small list maximum number, the frequency at which the data LPT table 51 is destaged increases. That is, the I/O load on the flash memory 20 is large. However, since there is little update information 76 stored in the journal list 70, the time required for restoration is shortened. Furthermore, as a result of the small data size of the journal list 70, the area used in the flash memory 20 is small.

The third example, as was mentioned hereinabove, is applicable to at least one of the first example or the second example. Therefore, for example, the list maximum number may be able to be changed for at least one of the first and second journal lists 270a and 270b.

EXAMPLE 4

A fourth example will be explained below. Furthermore, the fourth example is applicable to at least one of the first example through the third example.

In this example, the data LPT table 51 is managed by being partitioned into multiple tables.

Figure 15:
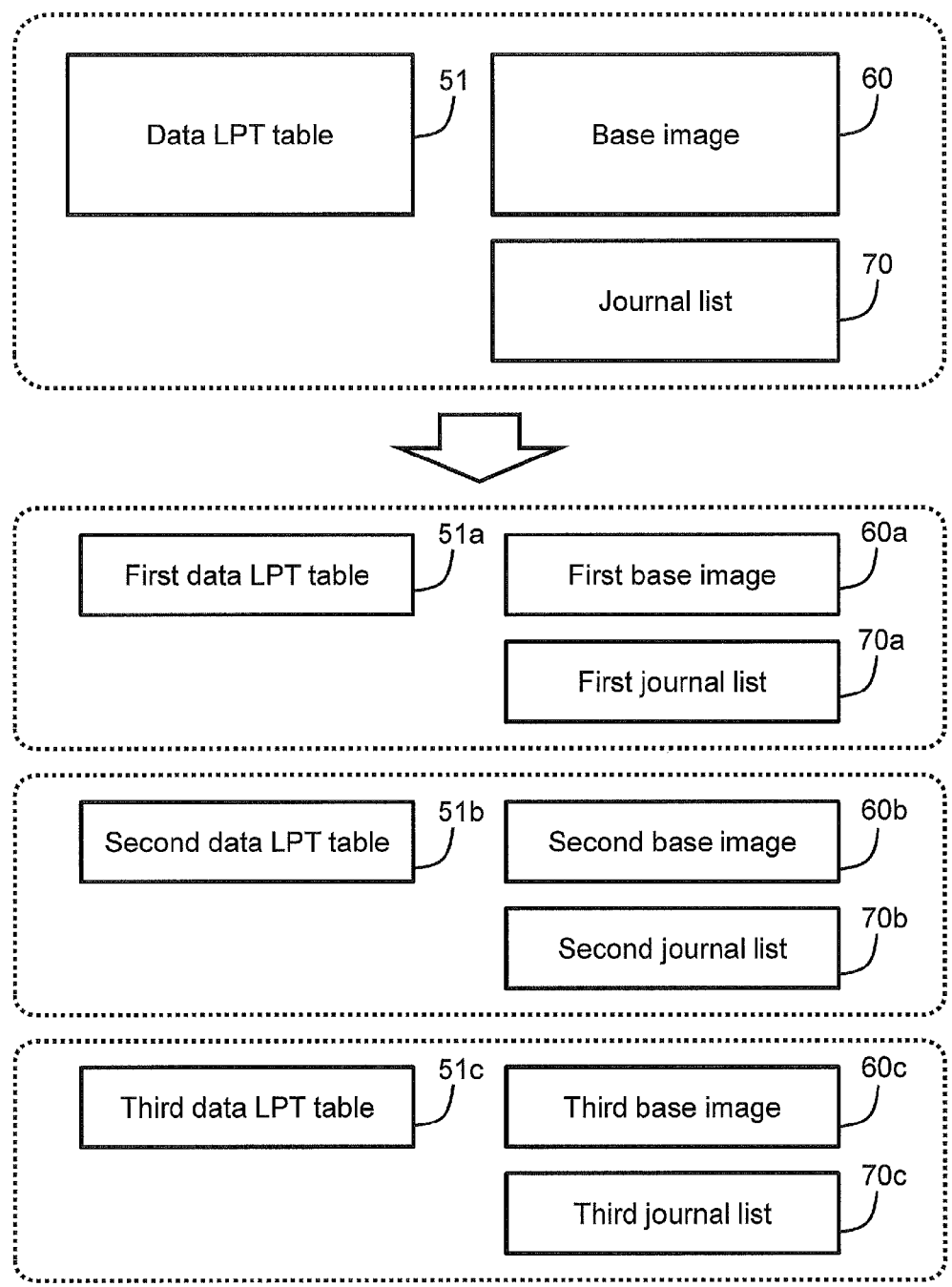
FIG. 15 shows an example of partitioning and managing the data LPT table.

FIG. 15 shows an example of partitioning and managing the data LPT table.

The control part 19 partitions the data LPT table 51 into a first through a third data LPT tables 51a, 51b, 51c. The base image 60 and the journal list 70 are also partitioned pursuant to partitioning the data LPT table 51. That is, the first data LPT table 51a comprises corresponding relationships with a first base image 60a and a first journal list 70a. The second and third data LPT tables 51b and 51c respectively comprise the same types of corresponding relationships.

In accordance with this, for example, the first data LPT table 51a is restored by the first journal list 70a being reflected in the first base image 60a.

Figure 16:
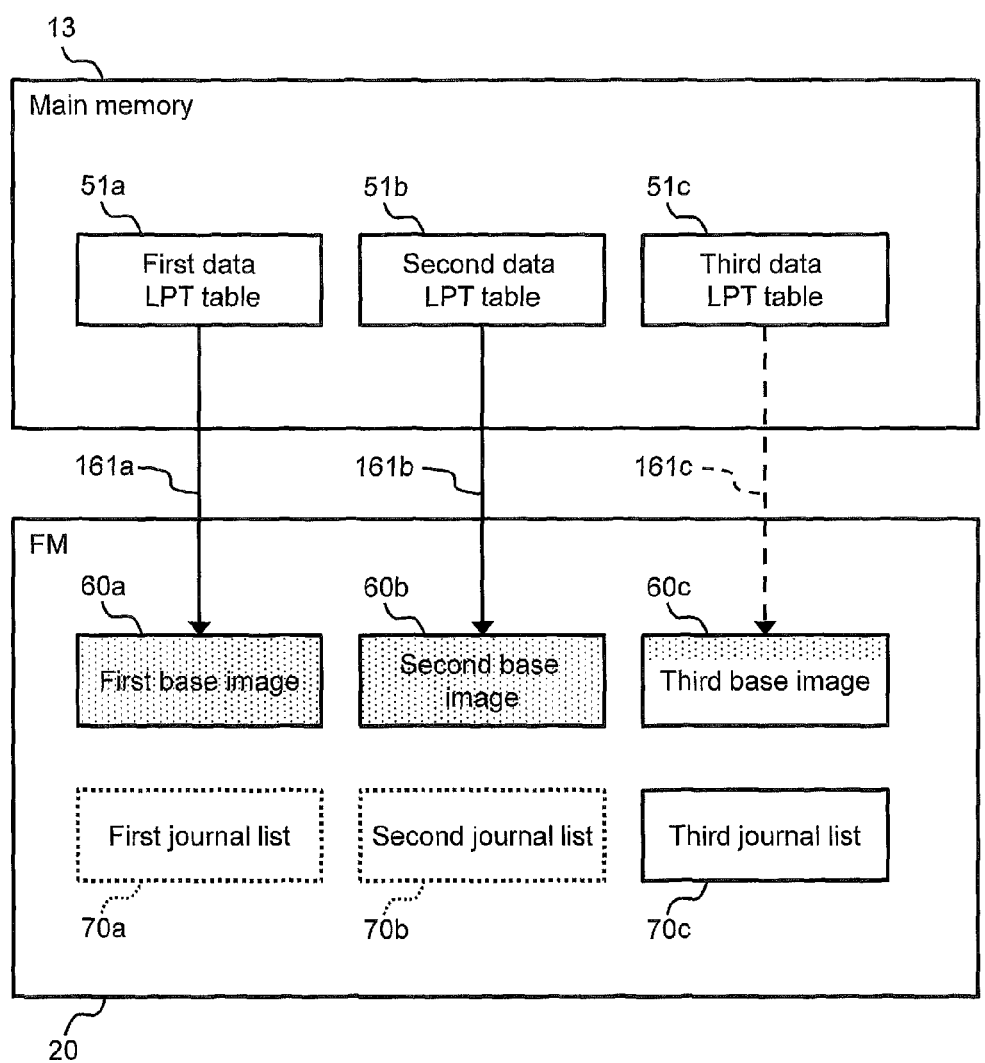
FIG. 16 shows examples of the saving and restoring of a first through a third data LPT tables.

FIG. 16 shows an example of saving and restoring the first through the third data LPT tables.

The first through the third data LPT tables 51a, 51b, 51c are independently saved to each of the first through the third base images 60a, 60b, 60c, respectively. Furthermore, the update information 76 of the first through the third data LPT tables 51a, 51b, 51c is also independently appended to each of the first through the third journal lists 70a, 70b, 70c, respectively. Then, the first through the third data LPT tables 51a, 51b, 51c are independently restored from each of the first through the third base images 60a, 60b, 60c, and the journal lists 70a, 70b, 70c, respectively.

A specific example will be described below using FIG. 16. The destaging of the first and the second data LPT tables 51a and 51b is completed to the first and the second base images 60a and 60b, respectively (161a, 161b). At the point in time at which the destaging is complete, the update information 76 of the first and the second journal lists 70a and 70b is erased since it is no longer needed. The destaging of the third data LPT table 51c to the third base image 60c is in progress (161c). Therefore, the update information 76 created in the third data LPT table 51c from the destage start time to the present time is stored in the third journal list 70c.

In a case where the power to the storage control apparatus 10 is shut off in this state, and the power is turned on thereafter, data can be restored as described hereinbelow.

Since the destaging of the first and the second data LPT tables 51a and 51b to each of the first and the second base images 60a and 60b is complete, the control part 19 can carry out restoration from the first and the second base images 60a and 60b. Since the third base image 60c corresponding to the third data LPT table 51c is in the middle of the destaging process, the control part 19 is not able to carry out restoration from the third base image 60c only. The control part 19 is able to restore the third data LPT table 51c by reflecting the third journal list 70c in the third base image 60c.

Figure 17:
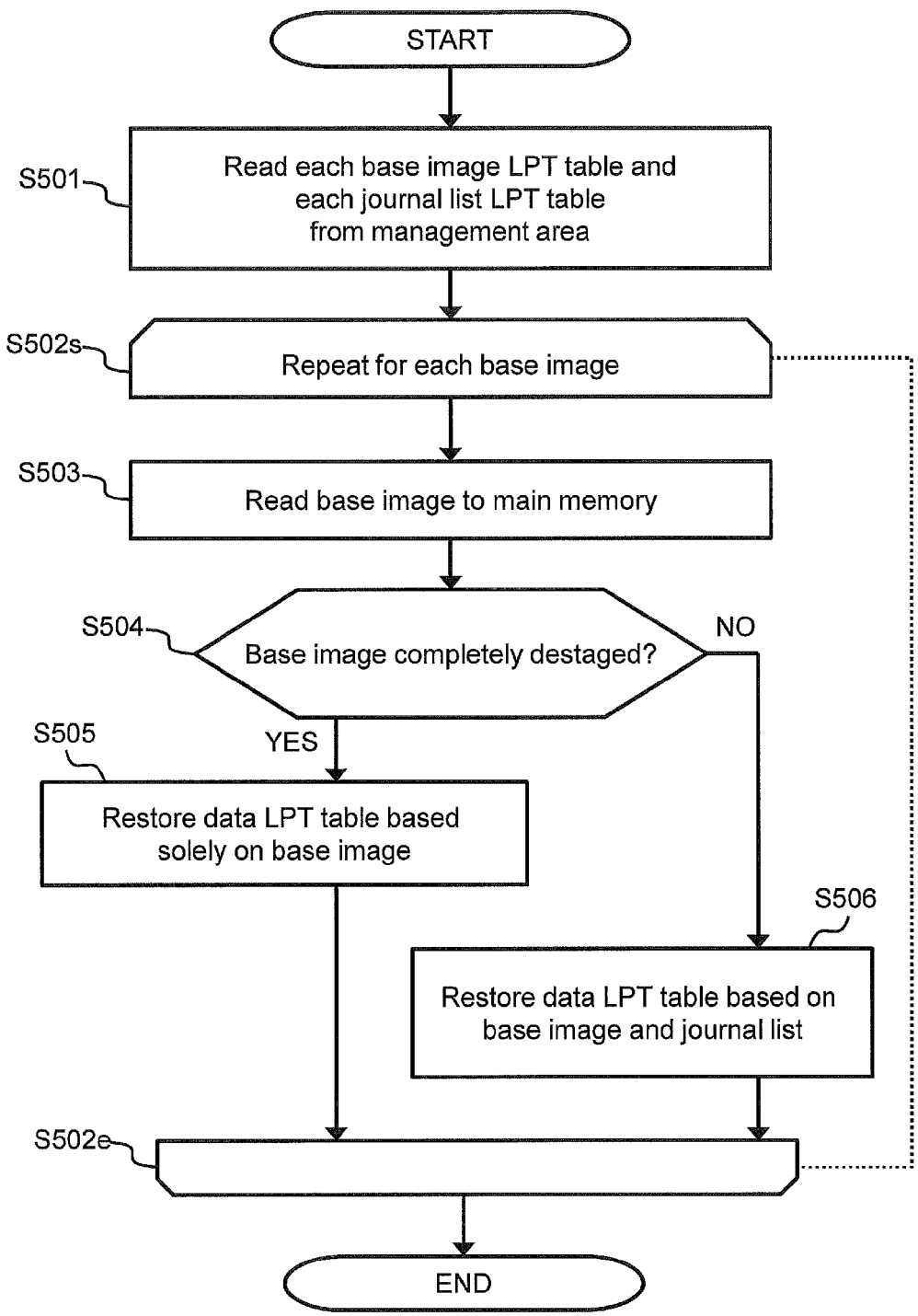
FIG. 17 shows an example of a flowchart of a process for restoring a first through a third journal list LPT table.

FIG. 17 shows an example of a flowchart of a process for restoring a first through a third journal list LPT tables.

The control part 19 reads each base image LPT table 61 and each journal list LPT table 71 from the management area 22 of the flash memory 20, and disposes these tables 61, 71 in the main memory 13 (S501).

The control part 19 repeats the processing of Step S502s through Step S502e for each base image 60 (S502s). For example, in a case where base images 60a, 60b, 60c exist, the Steps S502s through S502e are sequentially repeated beginning with the base image 60a.

The control part 19 references the base image LPT table 61, and reads the base image 60 to the main memory 13 (S503).

The control part 19 references destaging progress information assigned to the base image 60, and determines whether or not the base image 60 is completely destaged (S504). The destaging progress information is assigned to the base image 60 when destaging is performed, and denotes how far destaging has progressed.

In a case where the base image 60 has been completely destaged (S504: YES), the control part 19 restores the data LPT table 51 based solely on the base image 60 (S505) and proceeds to Step S502e.

In a case where the base image 60 has not been completely destaged (S504: NO), the control part 19 restores the data LPT table 51 based on the base image 60 and the journal list 70 corresponding thereto (S506), and proceeds to Step S502e.

When the processing of Step S502s through Step S502e has been completed for all the base images 60, this processing is ended (S502e).

Figure 18:
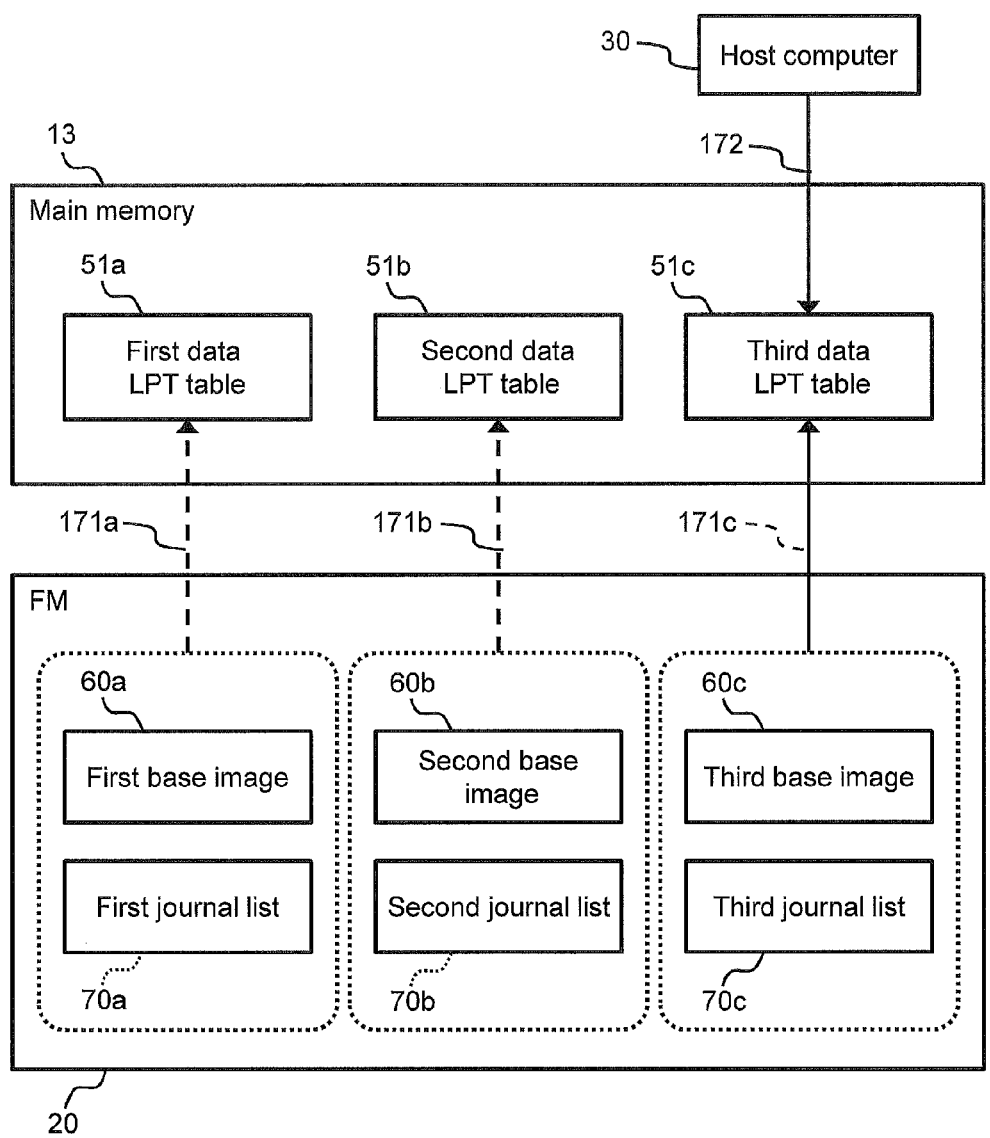
FIG. 18 shows an example of an overview of processing in a case where an access has been received from a host computer during a data restoration.

FIG. 18 shows an example of an overview of processing in a case where an access has been received from a host computer during a data restoration.

For example, it is assumed that the third data LPT table 51c is accessed from the host computer 30 during the restoration of the first data LPT table 51a (171a). At this time, the control part 19 preferentially restores the third data LPT table 51c, which has been accessed from the host computer 30 (171c). In addition, the control part 19 preferentially restores the logical address that has been accessed from the host computer 30. In addition, the control part 19, in a case where update information related to the logical address accessed from the host computer 30 exists, preferentially reflects these pieces of update information.

According to this example, the storage control apparatus 10 is able to respond to an access from the host computer 30 even when the data LPT table 51 is in the process of being restored. Furthermore, the storage control apparatus 10 is able to rapidly return a response by an access from the host computer 30 even when the data LPT table 51 is in the process of being restored. Furthermore, in a case where a timeout is configured for a host computer 30 access response, it is preferable that the respective base images 60a, 60b, 60c be partitioned into data sizes that are able to be restored within the time allotted up to this timeout.

As was mentioned hereinabove, the fourth example is applicable to at least one of the first example through the third example. For this reason, for example, instead of a single journal list, a first and second journal lists as were described using the second example may be prepared for each data LPT table obtained via partitioning. Then, the list maximum number for at least one of these journal lists may be able to be changed.

The several examples of the present invention described hereinabove are examples for illustrating the present invention, and do not purport to limit the scope of the present invention solely to these examples. A person with ordinary skill in the art should be able to put the present invention into practice using various other modes without departing from the gist of the present invention. For example, the journal comprises a post-update physical address corresponding to a logical address, but either instead of or in addition to this, the journal may comprise a pre-update physical address corresponding to a logical address.

REFERENCE SIGNS LIST

1 Storage system
10 Storage control apparatus
19 Control part
20 Flash memory

The invention claimed is:

1. A storage system comprising:
a storage, which comprises a nonvolatile storage medium; and
a storage control apparatus for inputting/outputting data to/from the storage,
wherein the storage control apparatus comprises:
a memory for storing management information, which is information used in inputting/outputting data to/from the storage; and
a control part for controlling access to the storage,
a secondary power source for supplying power to the memory and the control part when the supply of power from a primary power source, which is a power source of the storage system and the storage control apparatus, is shut off, and wherein the control part:
(A) stores the management information, which is stored in the memory, in the storage as a base image; and
(B) when the management information is updated subsequent to the base image being stored in the storage, creates a journal comprising information related to this update, and stores the journal in the storage as a journal group which is configured from multiple journals,
and wherein the management information comprising;
data logical address-physical address translation table, which is for showing the corresponding relationship between a physical address in the storage storing user data, and a logical address, which is associated with the physical address; and, base image logical address-physical address translation information, which is for showing the corresponding relationship between a physical address in the storage storing the base image, and a logical address, which is associated with the physical address in the storage storing the base image; and,
journal list logical address-physical address translation information, which is for showing the corresponding relationship between a physical address in the storage storing the journal group, and a logical address, which is associated with the physical address in the storage storing the journal group,
the control part:
when the supply of power from a primary power source is shut off, stores base image logical address-physical address translation table and journal list logical address-physical address translation table in the storage prior to the data logical address-physical address translation table, using the secondary power source.

2. A storage system according to claim 1, wherein
the journal comprises a logical address and a post-update physical address associated with this logical address,
the nonvolatile storage medium is a flash memory chip,
the storage is a flash memory comprising one or multiple flash memory chips,
in a case where the created journal exists in the memory when the supply of power from the primary power source is shut off, the control part stores the relevant journal in the storage as the journal group using the secondary power source in the (B), and
the control part, (C) restores the base image, which is stored in the storage, to the memory, and then restores the data logical address-physical address translation table to the memory by reflecting the journal group, which is stored in the storage, in the base image.

3. A storage system according to claim 2, wherein the storage system is able to store multiple journal groups,
the control part stores the journal prior to the processing of the (A) as a first journal group, and stores the journal subsequent to the processing of the (A) as a second journal group,
in the (C), in a case where the base image stored in the (A) is an incomplete base image in which a portion of the data logical address-physical address translation table stored in the memory in the (A) is not reflected, the control part restores the data logical address-physical address translation table by carrying out the following (c1) through (c3):
(c1) restoring the incomplete base image, which is stored in the storage, to the memory;
(c2) reflecting the first journal group in an area, of the incomplete base image, in which the portion of the data logical address-physical address translation table is not reflected; and
(c3) reflecting the second journal group in the base image in which the first journal group has been reflected.

4. A storage system according to claim 3, wherein the processing of the (A) is executed when the number of the journals included in the journal group has reached a maximum number, and
the maximum number can be changed for at least one of the multiple journal groups.

5. A storage system according to claim 4, wherein the data logical address-physical address translation table is partitioned into multiple sub-tables,
the journal group and the base image are associated and stored in the storage for each of the partitioned sub-tables, and
in a case where a utilization request for any one sub-table of the multiple sub-tables has been received while the partitioned multiple sub-tables are being restored to the memory, the control part preferentially restores the one sub-table for which the utilization request has been received.

6. A storage system according to claim 5, wherein the storage comprises a data area capable of storing data, and a management area, which is a smaller area than the data area and is capable of storing information for managing data stored in the data area, and
the control part:
stores the base image and the journal group in the data area; and
stores, in the management area, the base image logical address-physical address translation table and the journal list logical address-physical address translation table.

7. A storage system according to claim 1, wherein the storage system further comprises a secondary power source for supplying power to the memory and the control part when the supply of power from a primary power source, which is a power source of the storage system, is shut off, and
the control part:
in a case where the created journal exists in the memory when the supply of power from the primary power source is shut off, stores the relevant journal in the storage as the journal group using the secondary power source; and when restoring the data logical address-physical address translation table to the memory, restores the data logical address-physical address translation table to the memory by restoring the base image, which is stored in the storage, to the memory and then reflecting the journal group, which is stored in the storage, in the base image.

8. A storage system according to claim 7, wherein the storage system is able to store multiple journal groups, and the control part:

stores the journal prior to the processing of the (A) as a first journal group, and stores the journal subsequent to the processing of the (A) as a second journal group; and when restoring the data logical address-physical address translation table to the memory, in a case where the base image stored in the (A) is an incomplete base image in which a portion of the data logical address-physical address translation table stored in the memory in the (A) is not reflected, restores the data logical address-physical address translation table by restoring the incomplete base image stored in the storage, to the memory, and reflecting the first journal group in an area, of the incomplete base image, in which the portion of the data logical address-physical address translation table is not reflected, and then reflecting the second journal group in the base image in which the first journal group has been reflected.

9. A storage system according to claim 7, wherein the data logical address-physical address translation table is partitioned into multiple pieces of sub-data logical address-physical address translation table, the journal group and the base image are associated and stored in the storage for each of the partitioned pieces of sub-data logical address-physical address translation table, and in a case where a utilization request for any one piece of sub-data logical address-physical address translation table of the partitioned multiple pieces of sub-data logical address-physical address translation table has been received while the partitioned multiple pieces of sub-data logical address-physical address translation table are being restored to the memory, the control part preferentially restores the one piece of sub-data logical address-physical address translation table for which the utilization request has been received.

10. A storage system according to claim 1, wherein, the nonvolatile storage medium is a flash memory chip, the storage is configured from one or multiple flash memory chips, and when restoring the data logical address-physical address translation table to the memory, the control part restores the data logical address-physical address translation table to the memory by restoring the base image, which is stored in the storage, to the memory and then reflecting the journal group, which is stored in the storage, in the base image.

11. A storage system according to claim 10, wherein the storage system is able to store multiple journal groups, and the control part:

stores the journal prior to the processing of the (A) as a first journal group, and stores the journal subsequent to the processing of the (A) as a second journal group; and when restoring the data logical address-physical address translation table to the memory, in a case where the base image stored in the (A) is an incomplete base image in which a portion of the data logical address-physical address translation table stored in the memory in the (A) is not reflected, restores the data logical address-physical address translation table by restoring the incomplete base image stored in the storage, to the memory, and reflecting the first journal group in an area, of the incomplete base image, in which the portion of the data logical address-physical address translation table is not reflected, and then reflecting the second journal group in the base image in which the first journal group has been reflected.

12. A storage system according to claim 10, wherein the data logical address-physical address translation table is partitioned into multiple pieces of sub-data logical address-physical address translation table, the journal group and the base image are associated and stored in the storage for each of the partitioned pieces of sub-data logical address-physical address translation table, and in a case where a utilization request for any one piece of sub-data logical address-physical address translation table of the partitioned multiple pieces of sub-data logical address-physical address translation table has been received while the partitioned multiple pieces of sub-data logical address-physical address translation table are being restored to the memory, the control part preferentially restores the one piece of sub-data logical address-physical address translation table for which the utilization request has been received.

13. A storage system according to claim 1, wherein the storage system is able to store multiple journal groups, and the control part:

stores the journal prior to the processing of the (A) as a first journal group, and stores the journal subsequent to the processing of the (A) as a second journal group; and when restoring the data logical address-physical address translation table to the memory, in a case where the base image stored in the (A) is an incomplete base image in which a portion of the data logical address-physical address translation table stored in the memory in the (A) is not reflected, restores the data logical address-physical address translation table by restoring the incomplete base image stored in the storage, to the memory, and reflecting the first journal group in an area, of the incomplete base image, in which the portion of the data logical address-physical address translation table is not reflected, and then reflecting the second journal group in the base image in which the first journal group has been reflected.

14. A storage system according to claim 1, wherein the data logical address-physical address translation table is partitioned into multiple pieces of sub-data logical address-physical address translation table, the journal group and the base image are associated and stored in the storage for each of the partitioned pieces of sub-data logical address-physical address translation table, and in a case where a utilization request for any one piece of sub-data logical address-physical address translation table of the partitioned multiple pieces of sub-data logical address-physical address translation table has been received while the partitioned multiple pieces of sub-data logical address-physical address translation table are being restored to the memory, the control part preferentially restores the one piece of sub-data logical address-physical address translation table for which the utilization request has been received.

* * * * *